United States Patent [19]
Bird et al.

[11] Patent Number: 5,355,161
[45] Date of Patent: Oct. 11, 1994

[54] IDENTIFICATION SYSTEM FOR BROADCAST PROGRAM SEGMENTS

[75] Inventors: Richard M. Bird, Woodland Hills, Calif.; Houston F. Byrd, Lewisville, Tex.

[73] Assignee: Concord Media Systems, Beverly Hills, Calif.

[21] Appl. No.: 98,598

[22] Filed: Jul. 28, 1993

[51] Int. Cl.⁵ .............................................. H04N 7/01
[52] U.S. Cl. ........................................ 348/2; 348/907; 455/2
[58] Field of Search .......................... 358/142, 84, 139; 455/2, 67.1; 348/1, 2, 907, 4; H04N 7/01

[56] References Cited

U.S. PATENT DOCUMENTS

| | | | |
|---|---|---|---|
| 3,845,391 | 10/1974 | Crosby | 955/2 |
| 3,919,479 | 11/1975 | Moon et al. | 179/1 SB |
| 4,230,990 | 10/1980 | Lert, Jr. et al. | 455/67 |
| 4,250,524 | 2/1981 | Tomizawa | 358/122 |
| 4,450,531 | 5/1984 | Kenyon et al. | 364/604 |
| 4,547,804 | 10/1985 | Greenberg | 358/142 |
| 4,639,779 | 1/1987 | Greenberg | 358/142 |
| 4,677,466 | 6/1987 | Lert, Jr. et al. | 358/84 |
| 4,697,209 | 9/1987 | Kiewit et al. | 358/84 |
| 4,703,476 | 10/1987 | Howard | 370/76 |
| 4,739,398 | 4/1988 | Thomas et al. | 358/84 |
| 4,805,020 | 2/1989 | Greenberg | 358/147 |
| 4,857,999 | 8/1989 | Welsh | 358/84 |
| 4,931,871 | 6/1990 | Kramer | 358/142 |
| 4,945,412 | 7/1990 | Kramer | 358/142 |
| 5,019,899 | 5/1991 | Boles et al. | 358/84 |
| 5,162,905 | 11/1992 | Itoh et al. | 358/84 |

Primary Examiner—James J. Groody
Assistant Examiner—Glenton B. Burgess
Attorney, Agent, or Firm—Pretty, Schroeder, Brueggemann & Clark

[57] ABSTRACT

An automated program/commercial identification system that encodes and decodes an encoded data frame, which is added to an original program segment before it is broadcast. Within each encoded data frame, data is encoded to identify the original program segment and its prescribed time duration. A plurality of encoded data frames, altered by sequence codes, are repetitively generated for the duration of the encoded program segment to verify the encoded program segment's integrity. A phase-shift keyed modulation technique is used to place the encoded data frames in a notched-out section of the original program segment's audio channel, forming an encoded audio channel within the encoded program segment. Verification of the integrity of the encoded audio channel of the encoded program segment is achieved by monitoring the integrity of each encoded data frame. Additionally, the encoded program segment's video channel is verified by monitoring the integrity of the video channel's black/white or composite video levels and its sync level amplitude. Data from the encoded data frames is accumulated by one or more monitoring stations using a separate tuner for each monitored radio, television, or cable broadcaster. The encoded data is demodulated by sensing peaks in the phase-shift keyed subcarrier or, alternatively by correlating the modulated subcarrier with a local reference. The monitoring stations periodically transfer this data to a central computer, which compares this accumulated data to assigned program times for each encoded program segment and compiles a confirmation/discrepancy report.

30 Claims, 13 Drawing Sheets

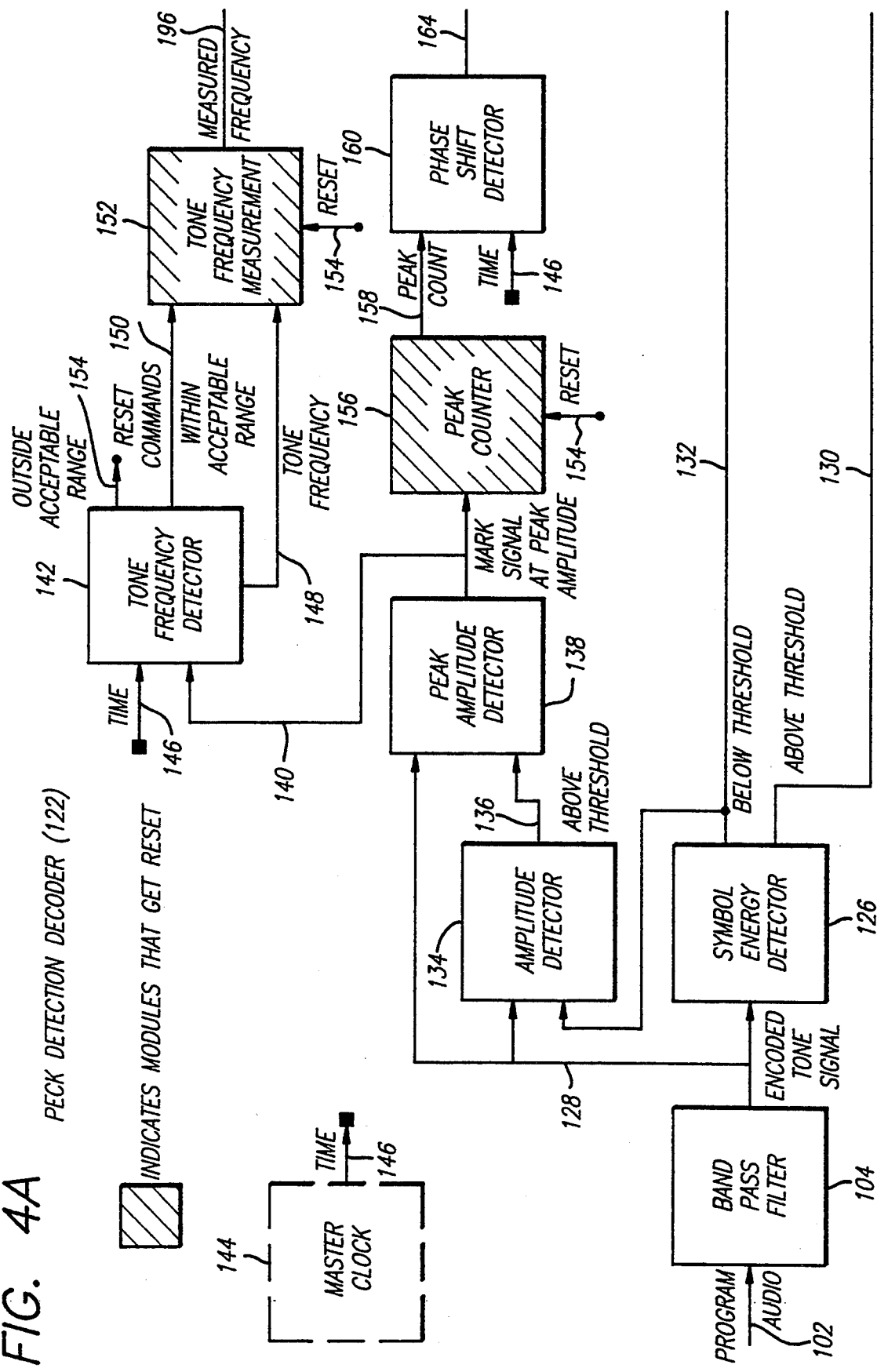

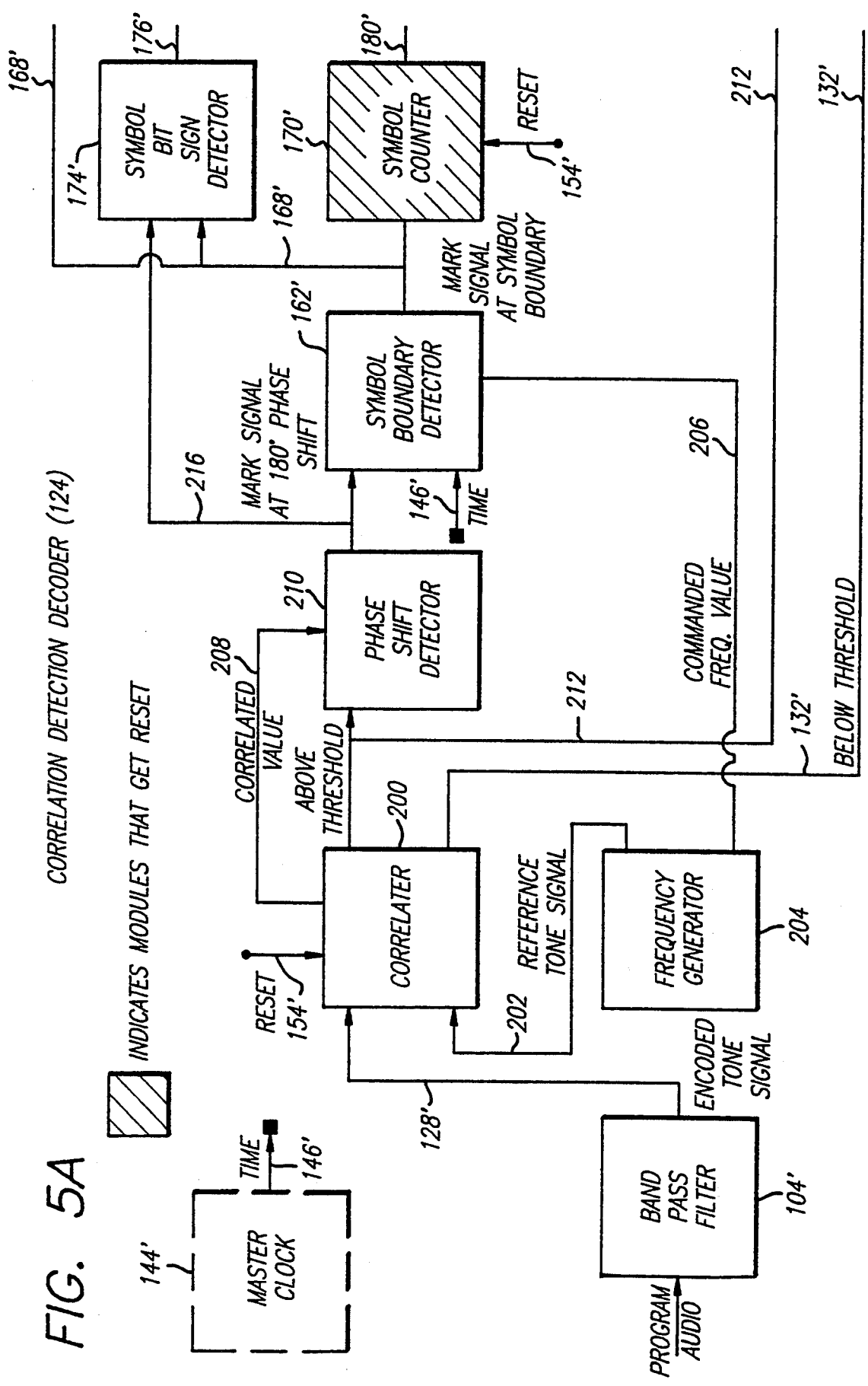

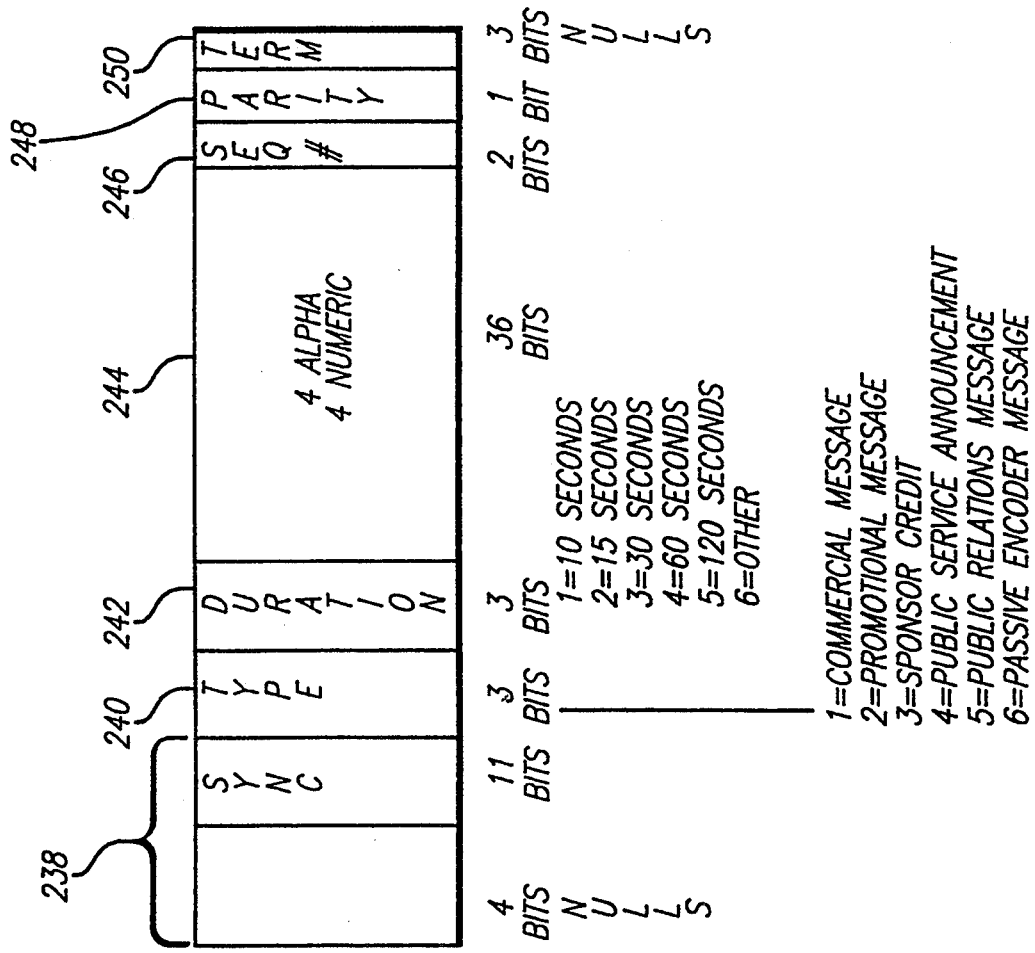

IDENTIFICATION SYSTEM FOR BROADCAST PROGRAM SEGMENTS

BACKGROUND OF THE INVENTION

This invention relates generally to systems that identify program segments broadcast by radio, television, or cable broadcasters and specifically to systems that identify and verify the integrity of the program segments, e.g., commercial advertisements or entire programs, using a superimposed frame of encoded data.

Commercial broadcast systems get their name, in part, due to the presence of commercials. Although distasteful to many, commercials are essential for television and radio broadcasters to generate the vast majority of their income. Even cable systems, which originally earned their reputations as being commercial-free alternatives, have quickly followed suit due to the significant income potential. Commercials provide name recognition to advertisers, enabling them to sell more of their products, and aid the advertisers to quickly generate a demand for new products and to test new marketing approaches. Thus, commercials have a substantial value to both the broadcasters and the advertisers.

Advertisers are willing to pay sizable sums of money only if broadcasters timely and completely broadcast their commercials. Many reasons exist for the advertiser's strict demands. For instance, an advertiser might be doing a time-limited sales campaign. If a particular commercial was broadcast after the end of such a sales campaign, this broadcast probably would be useless. Advertisers also target certain audiences and will pay significant premiums for a commercial broadcast within a program that captures a desired group of viewers. Thus, time or date shifting is not acceptable for a commercial. Additionally, commercials are carefully composed to be watched (or at least shown) in their entirety. Thus, a truncated broadcast of a commercial or one with audio or video dropouts is potentially useless.

Despite all well-intentioned efforts, commercials are sometimes broadcast at a wrong time, truncated, or broadcast with dropouts or other degradations. To receive payments from the advertisers, broadcasters generally must certify that each advertiser's commercial was timely and completely broadcast. Currently, this certification is manually performed.

Many attempts have been made to automate the identification of various program segments such as commercials. An ideal system would identify any and all program segments and correlate them with the appropriate advertisers without requiring any pre-processing efforts by either the advertisers or the broadcasters. Also, an ideal system would not alter or degrade the audio or video signals associated with each program segment. Such a system would need to correlate vast amounts of video and/or audio data to recognize each particular program segment.

Consequentially, such a system would also be highly susceptible to video or audio noise that intermittently could cause it to fail to recognize a program segment. Also, since the processing and storage requirements for such a system would be astronomical, such systems are not believed to be currently commercially feasible. Some systems have attempted to minimize these requirements by inserting cue sequences into the program segment to forewarn pattern recognition circuitry. Such a cue might be a blank video frame or a peculiar type of fade sequence. This type of alteration to the content of a program segment generally is not desirable.

Other systems have approached this task by encoding data within the video lines of the program segment. These systems generally use a particular line within the vertical blanking interval and thus outside the viewable image. Since these systems require high frequency processing and precise timing to encode and decode this data, they are not believed to have been commercially successful. Additionally, since these systems require a video channel, they can be used only with television and not radio broadcasters.

Other systems have combined modulated data with the audio channel of the program segment. Some of these systems have notched out sections of the audio channel within the range of human hearing and FSK-encoded data using audible frequencies with amplitudes that are substantially inaudible to the typical listener. In one system, a subaudible (below the nominal frequency range of human hearing) frequency band was chosen to encode the identification data and on-off keying of a fixed modulation frequency was used to designate the binary data content. Such a system is believed to have an undesirable amount of noise susceptibility, because it is not possible to differentiate between the absence of a modulation frequency and an off-keyed modulation state.

As previously discussed, program segments, in addition to not being broadcast at the proper time, might be truncated. It is still desirable to recognize a program segment, even when truncated. However, if a data encoding system required the full duration of the program segment to communicate the program segment's identity and duration, such a system would be too susceptible to errors.

It should therefore be appreciated that a need exists for a practical and thus marketable system to encode data onto the audio channel of a program segment with an encoding technique that is acceptably immune to noise and program segment truncations such that the system can still identify the program segment and determine its duration despite audio dropouts and program segment truncations. The present invention satisfies these needs.

SUMMARY OF THE INVENTION

Briefly, and in general terms, the present invention is embodied in a system that generates one or more encoded data frames that are added to an original program segment, e.g., a commercial or an entire program, to form an encoded program segment, where each encoded data frame identifies the original program segment and its prescribed duration. The encoded program segment is then broadcast by a television, radio or cable broadcaster. Upon receipt of the encoded program segment by a monitoring station, the encoded data frame extracted and is used to identify the program segment and its duration even when one of the encoded data frames is received with errors.

More specifically, the encoded data frame starts with a synchronization pattern and includes data that identifies the particular encoded program segment and its prescribed duration. Additionally, the encoded data frame includes a sequence code and a parity bit that are used to further detect and correct for broadcast errors. The encoded data frame is modulated and added to an audio channel of the original program segment. The modulation is performed using an integral number of whole or half cycles of a modulation frequency to represent each bit. Phase-shift keying (PSK) modulation is preferred.

The beginning and end portions of each encoded data frame include null bits, represented by the absence of the modulation frequency, which are used to detect error conditions where the beginning or the end of the encoded program segment is truncated. A plurality of encoded data frames are added, whenever possible, to the original program segment, to provide redundancy. This redundancy, in addition to aiding the monitoring station to detect encoded program segments that are truncated, also permits detection of audio dropouts within the encoded program segment. A video quality detector is also used to detect video dropouts during the broadcast of the encoded program segment.

An encoding station generates the encoded data frames and adds them to the original program segment to form the encoded program segment. An identification code and a prescribed duration are input to the encoding station, which uses this data to generate the encoded data frames. Encoding commences after either audio or video circuitry in the encoding station detects the presence of an audio or a video signal being played back from the original program segment. An integral number of encoded data frames are then added to the original program segment, limited by the duration of the original program segment as defined by a prescribed duration input. The encoded program segment can either be broadcast immediately or recorded and reproduced for use by a plurality of broadcasters.

A monitoring station includes a separate tuner for each broadcast channel, and time-shared digital signal processor demodulates and decodes each received signal. The signals are demodulated by measuring the time duration between successive peaks detected in the modulated carrier or, alternatively, by correlating the modulated carrier with a locally-generated frequency reference. The energy level of the received binary digits also is monitored, to determine the duration of the encoded data frame in the absence of proper synchronization. In addition, the rate of the received binary digits is measured and compared with a predetermined threshold, to confirm that the program is being broadcast at its desired rate.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIGS. 4A and 4B together are a simplified block diagram of a peak detection decoder that is the hardware equivalent of one suitable implementation for the digital signal processor portion of the station processor of FIG. 3.

FIGS. 5A and 5B together are a simplified block diagram of a correlation detection decoder that is a suitable alternative to the peak detection decoder of FIGS. 4A and 4B.

FIG. 8 is a chart of the encoded data fields that comprise each encoded data frame of the present invention.

DESCRIPTION OF THE PREFERRED EMBODIMENTS

Figure 1:
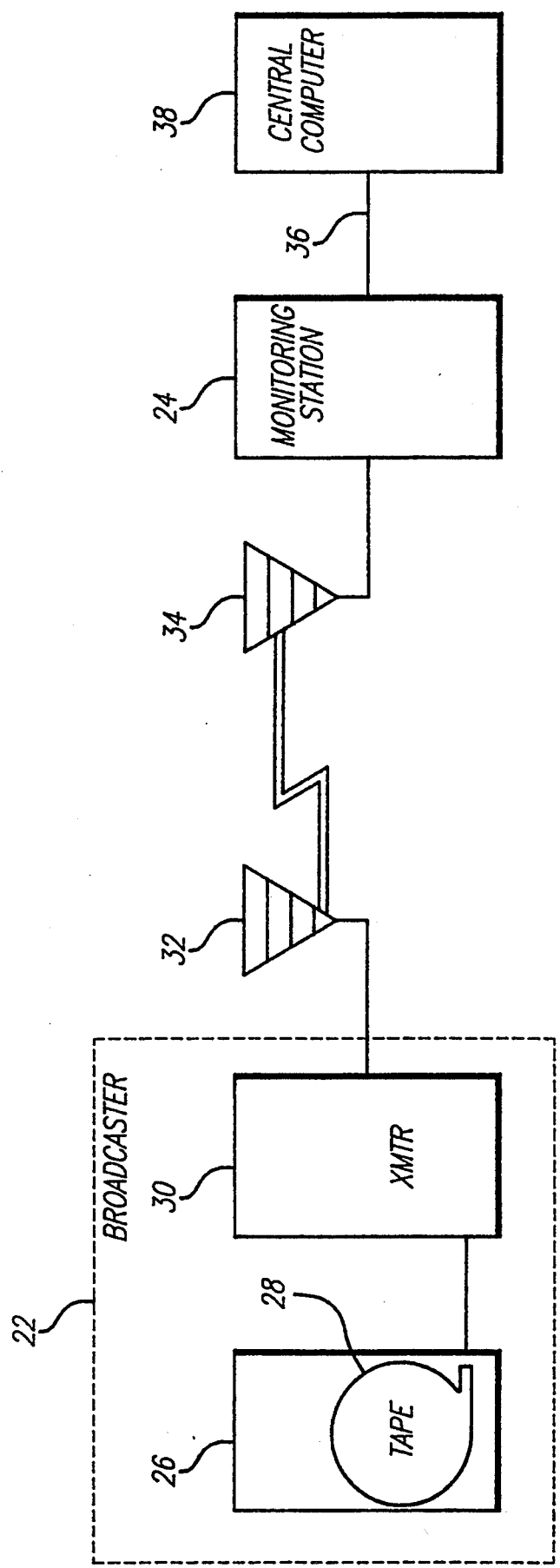
FIG. 1 is a block diagram of a broadcaster transmitting an encoded program segment tape to a monitoring system of the present invention.

With reference now to the drawings, and particularly to FIG. 1, there is shown an exemplary program segment identification system for broadcast television or radio, constructed in accordance with the principles of the present invention. A broadcaster 22 plays back and broadcasts an encoded program segment, e.g., a commercial advertisement or an entire program, for receipt and processing by a monitoring station 24. The broadcaster includes a tape player 26 for playing back an encoded master tape 28 that contains the encoded program segment, and further includes a transmitter 30 and an associated transmitting antenna 32 for transmitting the played back signal. The transmitted signal can be received at a plurality of locations throughout its broadcast range by standard broadcast receivers (not shown). The monitoring station receives the transmitted signal through a receiving antenna 34 and decodes the transmitted signal, to identify the encoded program segment.

The encoded submaster tape 28 is specially generated to contain identifying data within an encoded audio channel. When the encoded program segment is properly identified by the monitoring station 24, the station stores reference information, indicating the identification of the encoded program segment and its time of receipt. Periodically, the monitoring station transmits this reference information along a communication path 36 to a central computer 38, where it is compared with the agreed-upon broadcast schedule to compile a confirmation/discrepancy report.

The encoded submaster tape 28 is a specially adapted copy of an original program segment, e.g., a commercial, which has been modified to contain encoded data that identifies the original program segment and its prescribed duration. The original program segment is modified by adding the encoded data in a manner that is substantially undetectable to a normal viewer of the encoded program segment. In particular, a substantially inaudible encoded signal is added to a notched-out portion of an audio channel of the original program segment.

The encoded signal is made up of a succession of encoded data frames. Each encoded data frame has a defined format and includes: 1) a synchronization field to identify the frame's beginning, 2) a duration field to identify the program segment's expected duration, 3) a program segment identification field to identify the original program segment, 4) a sequence code field to identify the sequence of the encoded data frames, 5) a parity bit to verify data integrity, and 6) a terminator pattern to identify a truncated, encoded program segment. Generally, the encoded data frames are repeated a plurality of times within each encoded program segment. The monitoring station uses the sequence code field to identify the relative temporal position of each encoded data frame that is received within each encoded program segment. This format permits the monitoring station 24 to determine a proper time period to monitor the encoded program segment, even when one or more encoded data frames might be missing, and it also permits detection of encoded program segments that are truncated.

Due to the technique used to place the encoded data onto the encoded audio channel of the encoded submaster tapes 28, viewers will not notice any change. However, the monitoring station 24 will be able to retrieve the encoded data frame from the encoded program segment and use this data to confirm that the encoded program segments were properly broadcast according to an agreed-upon broadcast schedule.

Figure 2:
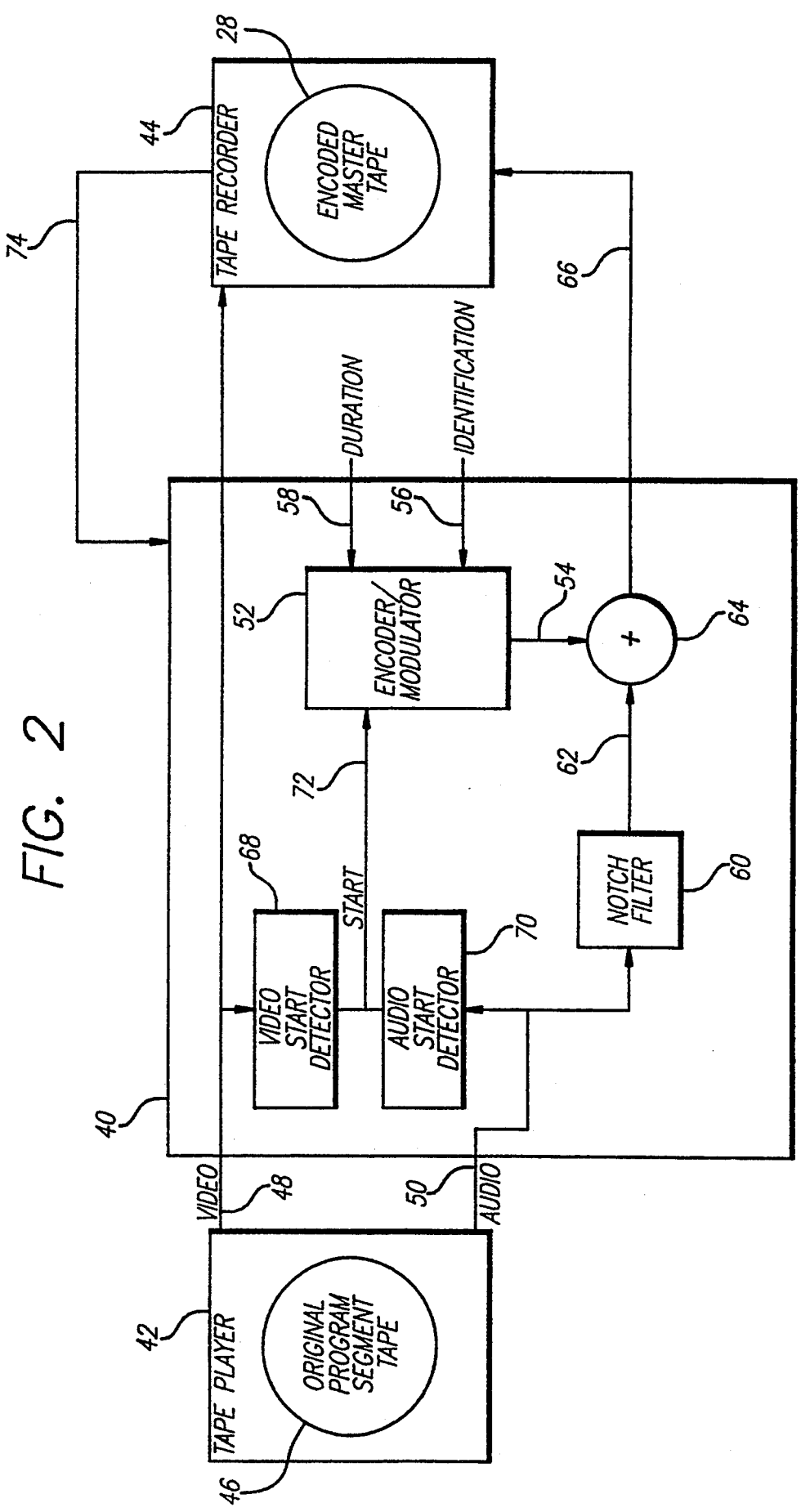
FIG. 2 is a block diagram of an encoding station that generates a tape that is played by the broadcaster shown in FIG. 1.

With reference now to FIG. 2, there is shown a block diagram of an encoding station 40 that cooperates with a tape player 42 and a tape recorder/player 44 to generate the subencoded master tape 28. An original program segment tape 46, containing the original program segment, is copied from the tape player to the tape recorder/player under control of the encoding station. During the copying process, a video signal supplied on line 48 from the tape player is input without modifications to the tape recorder/player. An audio channel signal supplied on line 50 from the tape player, on the other hand, is input to the tape recorder only after it first has been modified to add encoded data. This modification is performed by an encoder/modulator 52, which generates an encoded audio signal on line 54 that includes one or more encoded data frames.

Each encoded data frame is a fixed block of data, 7.5 seconds long, which is generated one or more times within the encoded program segment. A program segment identification signal is supplied on line 56 to the encoder/modulator 52, to identify the original program segment, and a time duration signal is supplied on line 58 to the encoder/modulator, to identify the prescribed duration of the original program segment. This program segment identification and time duration identification is encoded into each encoded data frame.

The encoded data is limited to a small section of the audio spectrum so that this modification of the audio channel signal is substantially undetectable to a listener. More particularly, a notch filter 60 removes a portion of the audio channel's signal supplied on line 50 and generates a notched audio signal on line 62. An adder 64 adds the notched audio signal to the encoded audio signal supplied on line 54 from the encoder/modulator 52, to form an encoded audio output signal on line 66. The encoder/modulator modulates data to generate the encoded audio signal by using a fixed number of cycles of a fixed modulation frequency to represent each bit of data. The modulation technique used is phase-shift keying or PSK, as described below. This encoded audio output signal is supplied on line 66 to the tape recorder/player 44, which records it on the encoded submaster tape 28.

Encoding begins when either a video signal or an audio signal is first detected from the original program segment tape 46 when it is played back on the tape player 42. A video start detector 68 monitors the video signal supplied on line 48, while an audio start detector 70 monitors the audio signal supplied on line 50. The purpose of the start detectors is to synchronize encoded and modulated data from the encoder/modulator 52 with the beginning of the encoded program segment. This is desirable for two reasons. First, measurements in the monitoring station 24 correspond to the beginning of the first encoded data frame, since the monitoring station assumes that the first encoded data frame also corresponds to the beginning of the encoded program segment. Second, since a plurality of encoded data frames of 7.5 seconds are sent for each encoded program segment and since encoded program segments (with the exception of a 10-second encoded program segment, considered below) typically are integral multiples of 7.5 seconds, no extra time is available for a late encoding start.

The video start detector 68 delays for no more than 1/60 second following an initial detection of the video signal supplied on line 48 before generating a start signal on line 72. Similarly, the audio start detector 70 delays for no more than 1/60 second following an initial detection of the audio signal supplied on line 50 to generate the start signal. This worst-case time delay corresponds to one half of the duration of a video frame. The encoder/modulator 52 commences generating the encoded audio signal immediately upon receipt of the start signal.

After encoding has been completed, the tape recorder/player 44 plays back the encoded submaster tape 28 to generate a tape output signal on line 74. The encoding station 40 processes the tape output signal, in a manner similar to that described below for the monitoring station 24, to confirm that 100% of the data can be successfully retrieved. After this verification has been completed, the encoded master tape is available for duplication and distribution to the broadcasters. Alternatively, the encoded program segment can be directly broadcast, without making a recorded copy.

Figure 3:
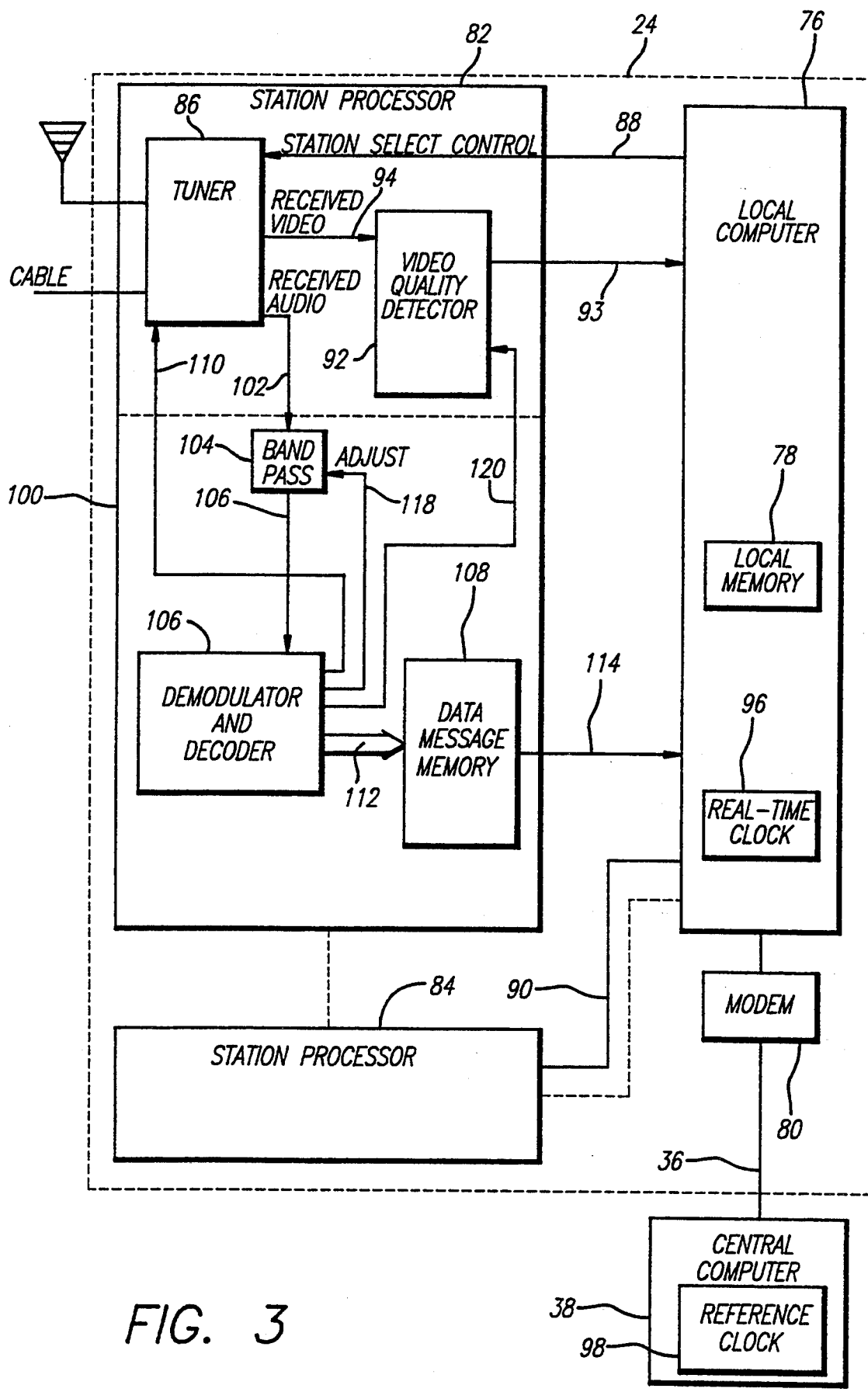
FIG. 3 is a block diagram of the monitoring system shown in FIG. 1.

With reference now to FIG. 3, there is shown a block diagram of the monitoring station 24. In the monitoring station, a local computer 76 accumulates received data and other related data and stores this data within a local memory 78 that can be RAM, disk, or any other type of computer-accessible memory. Included in this data is an identification of which station broadcast each encoded program segment that has been detected, the identity of the original program segment, its expected duration, corresponding audio and video quality indications for the expected duration, and the receipt time and date for the encoded program segment. Periodically, the local computer uses a modem 80 to securely send the contents of the local memory across the communication path 36 to the central computer 38. Techniques, well known in the art, are used to insure the receipt of correct data without corruption due to signal noise or modifications by potential intruders.

The data stored in the local memory 78 is derived from various sources. The identification of the original program segment and its expected duration is derived from the encoded data frames received from within each encoded program segment. However, the monitoring station 24 also accumulates other data, such as the audio and video quality indications and the receipt time and date, by monitoring internal monitors while receiving the encoded program segment.

The monitoring station 24 includes a plurality of station processors, two of which are shown at 82 and 84. A tuner 86 is used within each station processor for monitoring a separate broadcast or cable station. All of the station processors are connected to the local computer 76. The local computer is preprogrammed to instruct each tuner, using station select control lines 88 and 90, to monitor a particular station. These preprogrammed selections are stored as channel identification data within the local memory 78.

The encoded signal, previously added to the original program segment, contains unique program segment identification data, which is used to reference the data accumulated in the local memory 78. Also, within this encoded signal is data that corresponds to the expected duration of the original program segment. This data is used to set a time limit on video monitoring by the station processors 82 and 84. For example, when an encoded program segment is received and identified as having a 15-second duration, a video quality detector 92 will monitor the encoded program segment for this 15-second time period.

A received video signal is supplied on line 94 from the tuner 86, which extracts this video signal from the encoded program segment. The video quality detector monitors both the sync level amplitude and the black/white or composite video levels of the received video signal to generate video quality data. Additionally, the video quality detector retains a number of seconds of the video quality data as past-history data. This past-history data is required since 7.5 seconds are required to receive a complete encoded data frame from within an encoded program segment. Thus, when a complete encoded program segment is received, the corresponding past-history data from the video quality detector must be retrieved to match the actual beginning of the encoded program segment. The video quality detector outputs a signal indicative of the detected quality, for coupling on line 93 to the local computer 76.

As previously discussed, a plurality of encoded data frames generally are sent for each encoded program segment. Whenever an encoded data frame is successfully received, it can be used as a status indication that the quality of the audio signal on the encoded audio channel was satisfactory for the prior 7.5 seconds. Thus, this status indication is stored in the local memory 78 for the corresponding encoded program segment.

A real-time clock 96 within the local computer 76 maintains a time reference. A reference clock 98, maintained in synchronization with a national standard, e.g., WWV, is interfaced to the central computer 38. Periodically, the central computer communicates along the communication path 36 with the monitoring station 24 via the modem 80 and instructs the local computer to synchronize its real-time clock with the reference clock. When each encoded program segment is received, the local computer fetches the time and date from the real-time clock and time-stamps received data in the local memory 78 to correspond to this time and date. Thus, when data from the local memory is retrieved from the monitoring station, the retrieved times will correspond to a common reference and can then be used to confirm a precise broadcast time for each encoded program segment.

Since each monitoring station 24 simultaneously monitors a plurality of broadcasters, it is essential that certain sections of hardware be dedicated to each monitored broadcast channel. A digital signal processor or DSP 100, which is a digital computer with analog and digital input and output capability, is used to permit sharing of sections of the hardware that form the station processors. This implementation allows analog-type functions, such as bandpass filtering, to be shared between station processors and modified under software control. Additionally, other functions can be time-shared between broadcast channels. Although the DSP implementation is preferred, the present invention also encompasses conventional implementations of the functional blocks shown in FIG. 3. However, independent of the implementation, some elements such as the tuner 86 and the video quality detector 92 must be duplicated for each station processor.

Broadcast signals from television, radio or cable stations are input to the monitoring station 24 through the tuner 86. The local computer 76 uses the station select controls 88 and 90 to instruct each tuner which station to monitor. As previously mentioned, the tuner outputs the received video signal on line 94 to the video quality detector 92. The tuner also outputs a received audio signal, which corresponds to the encoded audio signal containing the phase-modulated digital data. The station processor 82 further processes this received audio signal to demodulate and decode the data and to transmit that data to the local computer 76.

The station processor 82 suitably processes the received audio signal using the DSP 100. The signal processing functions are shown in FIG. 3 to include a bandpass filter 104, a demodulator and decoder 106, and a data message memory 108. In particular, the bandpass filter receives the received audio signal on line 102, and its bandwidth is centered at 42 Hz, which is the center frequency of the modulated data, so as to remove all but that modulated data. The filtered audio signal is supplied on line 110 to the demodulator and decoder 106, which demodulates the modulated data to generate a corresponding binary data stream. That binary data stream is transmitted on lines 112 to the data message memory 108, which in turn transmits the data stream on line 114 to the local computer 76.

The demodulator and decoder 106 also generates several feedback control signals for controlling the tuner 86, the bandpass filter 104, and the video quality detector 92. In particular, a gain control signal is supplied on line 110 to the tuner, to adjust the amplitude of the received audio signal to a standard value. Further, a control signal is supplied on line 118 to the bandpass filter, to controllably adjust its center frequency so as to maximize the amplitude of the filtered audio signal. Finally, a segment start time signal is supplied on line 120 to the video quality detector 92, to instruct the video quality detector when to begin monitoring video quality.

The portion of each station processor 82, 84 that is implemented by the digital signal processor (DSP) 100 is described more particularly with reference to FIGS. 4 and 5. FIG. 4 depicts one suitable configuration for the DSP, configured as a peak detection decoder 122, and FIG. 5 depicts an alternative configuration for the DSP, configured as a correlation detection decoder 124. Although the DSP, of course, is implemented in software, FIGS. 4 and 5 are shown as conventional hardware block diagrams that are the functional equivalent of the DSP software. These hardware equivalents are considered preferable for explanatory purposes.

Figure 4B:
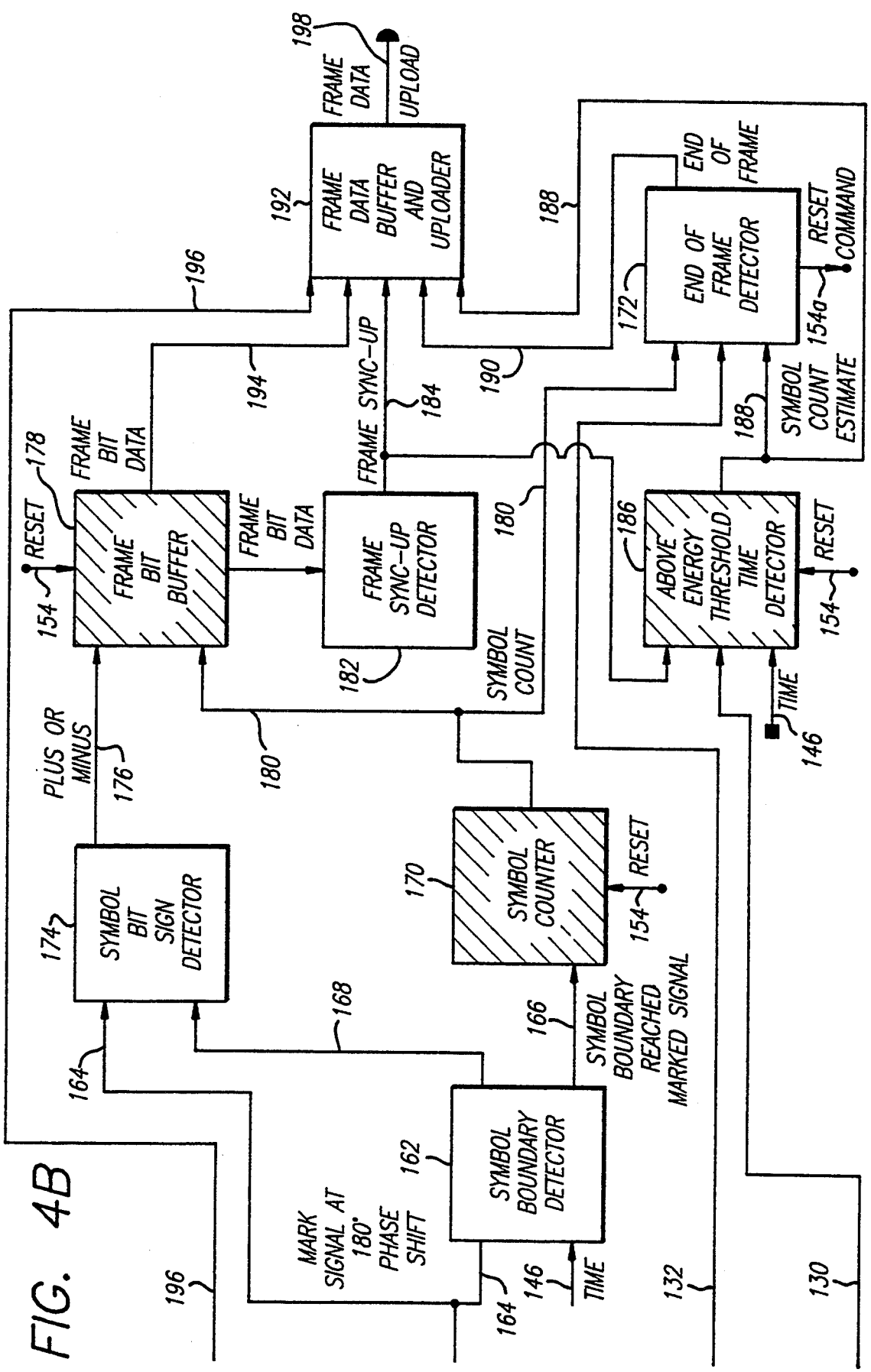

With reference now to FIGS. 4A and 4B, the peak detection decoder 122 is shown to receive the program audio signal on line 102 and to initially filter that signal in the bandpass filter 104. This passes the encoded signal, but filters out nearly all of the remaining audio. A symbol energy detector 126 receives the filtered program audio on line 128 and measures its energy over a symbol period. If the energy exceeds a predetermined threshold, the detector outputs an above-threshold signal on line 130. Conversely, if the detected energy is measured to be below that threshold, the detector outputs a below-threshold signal on line 132. An amplitude detector 134 receives both the below-threshold signal on line 132 and the filtered program audio signal on line 128, and it generates an above-threshold signal when the filtered program audio signal first exceeds a predetermined threshold. This, of course, ordinarily occurs at the beginning of each data frame, which in the preferred embodiment includes a sequence of 4 null symbol bits, followed by 11 sync-up symbol bits.

The above-threshold signal produced by the amplitude detector 134 at the beginning of each data frame is transmitted on line 136 to a peak amplitude detector 138. Upon receipt of that above-threshold signal, the peak amplitude detector begins monitoring the encoded tone signal present on line 128, and it outputs a mark pulse signal each time a positive peak is detected in the encoded tone signal. The frequency of these mark pulses, of course, corresponds to the frequency of the encoded tone signal. The mark pulses are supplied on line 140 to a tone frequency detector 142, which measures the time duration between five successive mark pulses and calculates the tone frequency. Timing signals supplied on line 144 from a master clock 146 are used in performing this calculation. If the calculated tone frequency is determined to be within an acceptable range, indicating that the program audio is being received at a speed substantially the same as its intended speed, the tone frequency detector 142 transmits the calculated tone frequency and an acceptable range signal on lines 148 and 150, respectively, to a register 152. If, on the other hand, the tone frequency detector determines that the calculated tone frequency is outside the acceptable range, the detector outputs a reset command for transmission on line 154 to several circuits in the peak detection decoder 122, one such circuit being the register 152.

The mark pulses present on line 140 also are transmitted to a peak counter 156, which provides a running count of the number of peaks received during the current symbol period. This peak count, in turn, is transmitted on line 158 to a phase-shift detector 160, which receives the count and compares it with time signals received on line 146 from the master clock 144. The phase-shift detector compares the actual receipt time of each pulse count with a predicted receipt time it has calculated and, if the actual count is received later than the predicted count by more than a predetermined threshold, then it determines that a 180-degree phase shift has occurred.

A symbol boundary is established when two successive alternating symbol bits have been detected, i.e., either a 010 or a 101. A symbol boundary detector 162 receives mark pulses on line 164 from the phase-shift detector 160, which indicate the occurrence of a 180-degree phase shift in the received tone signal. The symbol boundary detector 162 also receives timing signals on line 146 from the master clock 144 and, based on those inputs, determines when two successive alternating symbol bits, i.e., either 010 or 101, have occurred. The symbol boundary detector 162 also determines that a symbol boundary has occurred based on a predicted symbol period, with no 180-degree phase shift having been detected. This latter determination occurs when two successive symbol bits are of the same polarity. The symbol boundary detector 162 then outputs a pulse on lines 166 and 168 each time a symbol boundary is determined to have occurred.

A symbol counter 170 receives the pulses on line 166 from the symbol boundary detector 162 and maintains a running count on the number of symbol boundaries that have occurred since last being reset. This count is reset to 0 upon receipt of reset command from either the tone frequency detector 142, discussed above, or from an end-of-frame detector 172, discussed below.

A symbol bit sign detector 174 receives the pulses on line 168 from the symbol boundary detector 162, and it also receives mark signals on line 164 from the phase-shift detector 160 each time a 180-degree phase shift has been detected. If both pulses are received simultaneously, then it is determined that a sign change has occurred; otherwise, it is determined that the sign has remained the same. The symbol bit sign detector 174 outputs on line 176 a signal indicating the sign of the current symbol bit. This signal is clocked into a frame bit buffer 178 by pulses received on line 180 from the symbol counter 170. The current symbol count controls the bit position of the frame bit buffer 178 into which the current symbol value is stored. The frame bit buffer is cleared to 0 when a reset command has been received.

A frame sync-up detector 182 monitors the bits stored in the frame bit buffer 178 and compares those bits with a predetermined, stored bit pattern. When the bit patterns match each other, the frame sync-up detector determines that frame sync-up has occurred and outputs a frame sync-up signal on line 184.

As mentioned above, the peak detection decoder 122 monitors the time duration in which the symbol energy exceeds a predetermined threshold, so that an indication of the receipt of a signal can be made even though synchronization has not been achieved. This is accomplished using an above-energy threshold time detector 186, which receives the above-threshold signal on line 130 from the symbol energy detector 126, as well as timing signals on line 146 from the master clock 144. The detector 186 provides a running count of the time in which symbol energy has been determined to be above the predetermined threshold. This running count is a measure of the frame duration and is useful when either a head cut or a tail cut has occurred. This count is reset upon receipt of a frame sync-up signal on line 184 or upon receipt of a reset signal on line 154.

The end-of-frame detector 172 monitors the actual symbol count signal received on line 180 from the symbol counter 170, as well as the symbol count estimate received on line 188 from the above-energy threshold time detector 186, so as to determine when the end of the current data frame has occurred. This determination also is made upon receipt of a below-threshold signal on line 132 from the symbol energy detector 126. A reset command is output on line 154a when an end-of-frame has been detected. At the same time, an end-of-frame signal and the symbol count estimate are transmitted on lines 190 and 188, respectively, to a frame data buffer and uploader 192. Also supplied to this buffer and uploader are the frame sync-up signal on line 184 from the frame sync-up detector 182, the frame bit data on line 194 from the frame bit buffer 178, and a measure of the tone frequency on line 196 from the tone frequency measurement register 152. This accumulated data is output periodically on lines 198.

Figure 5B:
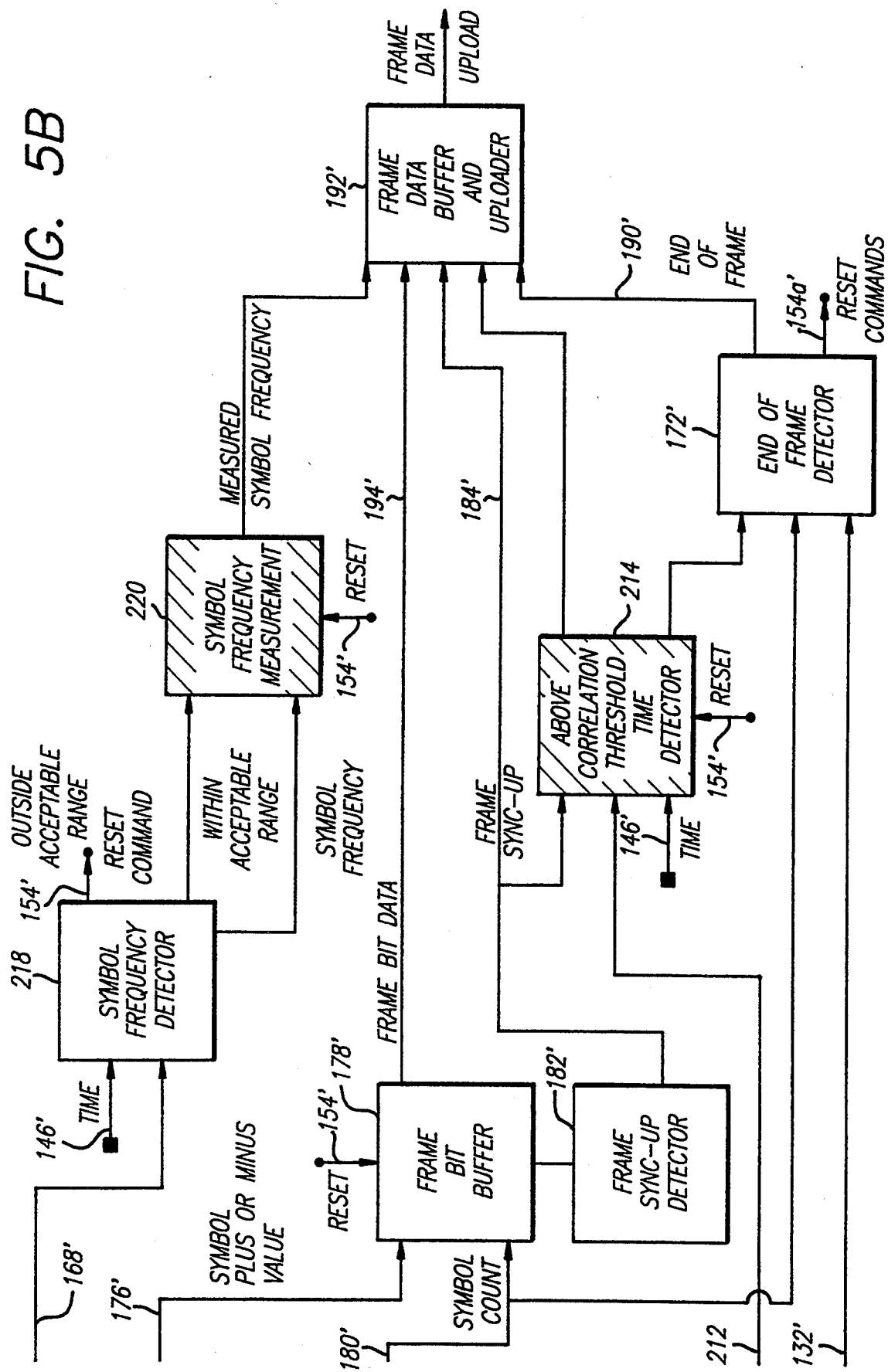

FIGS. 5A and 5B together are a simplified block diagram of a correlation detection decoder 124, which is a suitable alternative to the peak detection decoder 122 of FIGS. 4A and 4B. Again, this decoder is preferably implemented in a digital signal processor, and the block diagram of FIGS. 5A and 5B represents a hardware equivalent to the preferred software implementation. The correlation detection decoder is similar in many respects to the peak detection decoder, and similar blocks are identified using the same reference numerals, but accompanied by a symbol. The primary difference between the two decoders lies in the initial detection of the incoming encoded tone signal.

With reference to FIGS. 5A and 5B, the program audio signal received on line 10 is initially filtered in a bandpass filter 104', to remove most of the audio and pass just the encoded tone signal. This encoded tone signal is transmitted on line 128' to a correlator 200, which correlates the tone signal with a locally-generated tone signal received on line 202 from a frequency generator 204. The frequency of the locally-generated signal is controlled by an appropriate feedback signal supplied on line 206. The correlator 200 integrates the crosscorrelation of the two incoming signals beginning from a 0 value, when reset by a reset command supplied on line 154'. The correlation value is transmitted on line 208 to a phase-shift detector 210.

When a phase shift in the encoded tone signal occurs, the correlation value will change its polarity or sign, and the integrated correlation value will begin ramping in an opposite direction from its prior direction. This direction change provides a basis for phase-shift detection. As previously mentioned, the initial 8 bits in each frame alternate in value, so a phase shift will occur at the end of each bit. The correlation detection decoder is configured such that a difference as high as 5% between the frequencies of the encoded tone signal and the locally-generated tone signal will cause a reduction in the maximum correlation value of only 20%.

When the correlator 200 determines that the integrated correlation value exceeds a predetermined threshold, an above-threshold signal is transmitted on line 212 to the phase-shift detector 210, to initiate the phase-shift detection process. This signal also is supplied to an above-correlation threshold time detector 214, to activate the symbol count estimation process, in similar fashion to the corresponding block of the peak detection decoder of FIGS. 4A and 4B. When the integrated correlation value is below the predetermined threshold, on the other hand, the correlator 200 transmits a below-threshold signal on line 132' to an end-of-frame detector 186', to indicate that the end of the frame has been detected.

The phase-shift detector 210 is activated by the above-threshold signal received on line 212 of the correlator 210, and it then monitors the correlation signal received on line 208 to detect a sign change in that value. If a sign change is detected, that represents a 180-degree phase shift in the encoded tone signal, and the phase-shift detector 210 marks that occurrence by outputting a mark pulse on line 216. Such pulses correspond to the mark pulses present on line 164 in the peak detection decoder 122 of FIG. 4.

The mark pulses present on line 216 are supplied to a symbol boundary detector 162', which also receives timing signals on line 146' from a master clock 144'. Based on these two inputs, the symbol boundary detector outputs a mark pulse at the end of each detected symbol. In addition, the symbol boundary detector 162' calculates the tone frequency value for the current symbol bit and compares that value with the value for the previous symbol bit. If the two are substantially the same, it is determined that the locally-generated tone frequency has the correct tone frequency and no adjustment is made to the feedback control signal being supplied by the symbol boundary detector 162' to the frequency generator 204. On the other hand, if the calculated tone frequency value for the current bit is determined to be different from that of the previous bit, an appropriate adjustment is made to the feedback control signal. In this way, loop stabilization can be achieved within 8 symbol bit periods for an initial frequency difference as high as 5%.

The mark pulses output by the symbol boundary detector 162' are transmitted on line 168' to a symbol frequency detector 218, which measures the time delay between successive mark pulses. Based on that measurement, it calculates the tone frequency and determines whether or not that calculated tone frequency is within an acceptable range. In this regard, the symbol frequency detector 218 corresponds to the tone frequency detector 142 of FIG. 4A, except that the mark pulses it receives represent symbol boundaries rather than tone frequency peaks. Consequently, a mere scaled adjustment needs to be made. A similar correspondence exists between a symbol frequency measurement register 220 and the tone frequency measurement register 152 of FIG. 4A.

The remainder of the correlation detection decoder 124 of FIGS. 5A and 5B are substantially identical in structure and function to the corresponding portion of the peak detection decoder 122 of FIGS. 4A and 4B. In particular, the symbol bit sign detector 174', symbol counter 170', frame bit buffer 178', frame sync-up detector 182' end-of-frame detector 172', and frame rate buffer and uploader 192' all correspond to the correspondingly named blocks of FIG. 4.

Figure 6A:
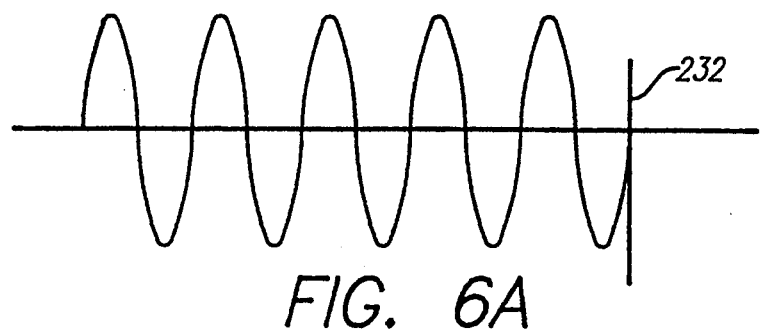
FIGS. 6A-B are waveforms illustrating sinusoidal patterns that represent the binary phases of a PSK signal.
Figure 6B:
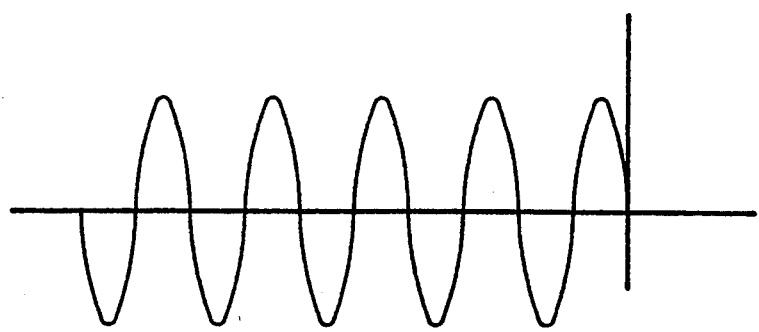
Figure 6C:
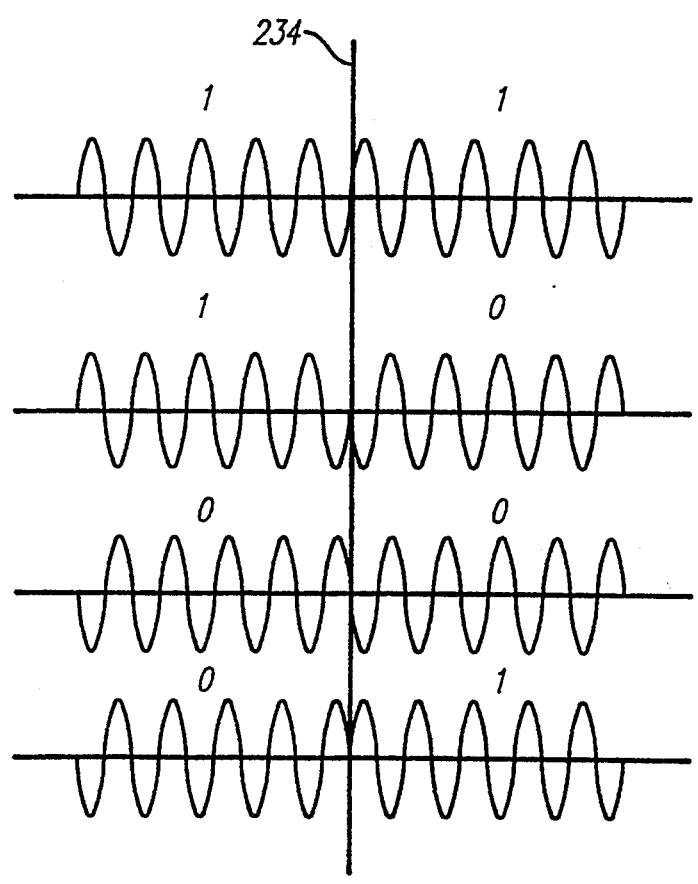
FIG. 6C are waveforms illustrating potential bit transitions of the sinusoidal patterns generated by the PSK signals of FIGS. 6A-6B.

With reference now to FIGS. 6A–6C, there are shown multiple representations of binary digits or bits comprised of a plurality of cycles of the modulation frequency of a phase-shift keyed or PSK signal. A first phase of the modulation frequency is chosen to represent a 1 or mark bit while a second phase of the modulation frequency represents a 0 or space bit. A plurality of cycles of the modulation frequency are employed to diminish the spread of harmonics. Although it is desirable to narrow the required bandwidth to reduce interference with the existing audio spectrum of the original program segment, a design limitation is imposed by the requirement for a reasonable bit rate.

In the preferred embodiment, a modulation carrier frequency of 42 Hz is selected. This frequency is below 50 Hz, a required minimum audio response frequency for a television or FM radio station. Consequentially, most of the audio spectrum of original program segments is above 50 Hz. Since broadcasters differ in their performance below this required minimum audio response frequency, the choice of 42 Hz was made to correspond to a typical minimum audio response, as measured from a group of broadcasters. A modulation rate is chosen that represents each bit with an integral number of cycles of the modulation frequency. This is referred to as N-cycle modulation. In N-cycle modulation, 5 cycles of the modulation frequency represent each bit, achieving a bit rate of 42/5 or 8.4 bps. One of ordinary skill in the art will recognize that, since the majority of the spectrum of the modulated signal will be less than 50 Hz, the modulated signal will not significantly interfere with the audio content of the original program segment, which is above 50 Hz. Additionally, since a normal listener is less sensitive to lower frequencies, it is not believed that a normal listener will hear the modulated signal.

In FIG. 6A, 5 cycles of the first phase of the modulation frequency are shown, corresponding to a 1 or mark bit. Similarly, FIG. 6B shows 5 cycles of the second phase, corresponding to a 0 or space bit. Each bit is generated by a sinusoidal sequence where the opposite bit is generated by the identical sequence multiplied by −1, corresponding to a phase shift of 180°. The significance of this phase definition is illustrated below.

The value of the modulated signal at a transition point 232, the end of each bit representation, is zero, referred to as a zero crossing. Consequently, transitions between the two phases will always occur between two signals of opposite phases but with an identical transition value of zero, thus minimizing the harmonic content of the modulated signal above the modulation frequency.

With reference to FIG. 6C, the four potential bit transitions of 1-1, 1-0, 0-0, and 0-1 are illustrated. Since all patterns are uniquely identifiable and, since all bit transitions occur at a bit transition point 234, corresponding to a zero crossing, the magnitude of the harmonics are minimized.

Figure 7A:
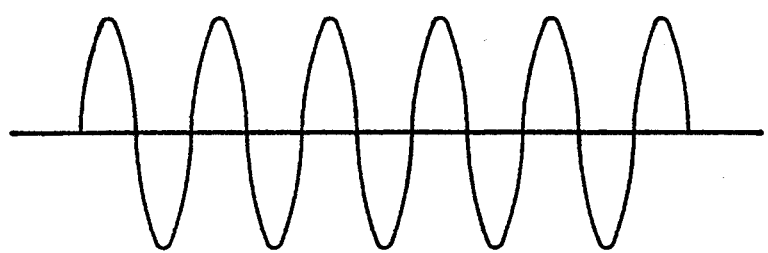
FIGS. 7A-B are waveforms illustrating sinusoidal patterns that represent the binary phases of an alternative PSK signal.
Figure 7B:
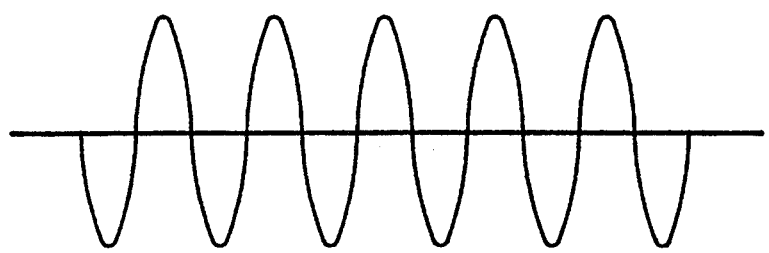
Figure 7C:
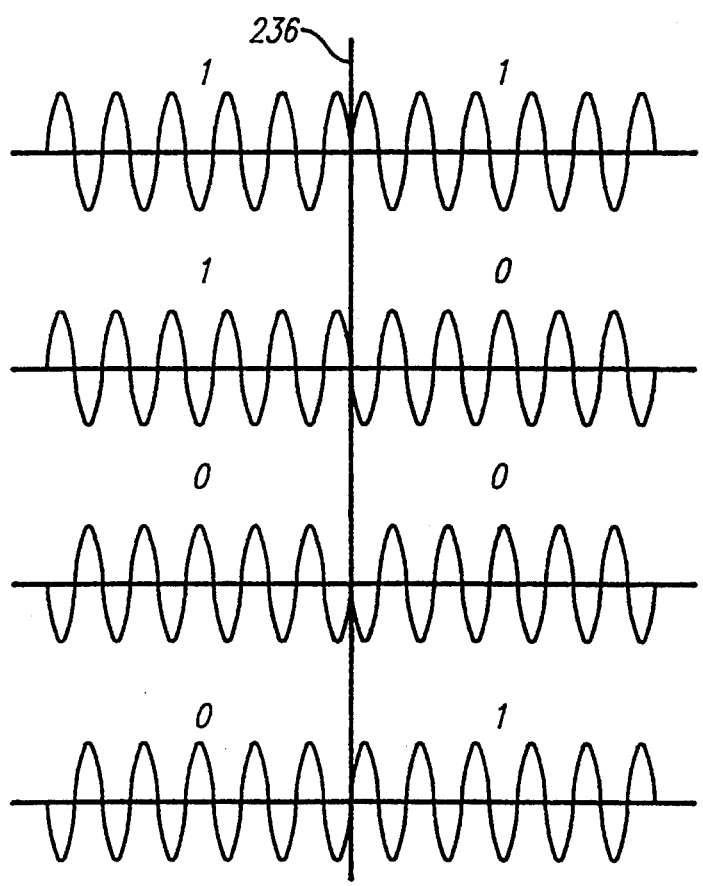
FIG. 7C are waveforms illustrating potential bit transitions of the sinusoidal patterns generated by the PSK signals of FIGS. 7A-B.

With reference now to FIGS. 7A–7C, an alternative technique of generating a PSK signal is shown, referred to as N+½-cycle modulation, where an additional ½ cycle is used for each bit time period. Thus, an integral number of half cycles of the modulation frequency is used to represent each bit. With a bit duration of 5½ cycles, a bit rate of approximately 7.63 bps is attained. The significance of this alteration is not found in the minor bit rate or spectrum alterations, but instead is found by reference to the bit transition diagrams of FIG. 7C. With this technique, the pattern associated with each phase recommences at each bit transition point 236. Thus, although transitions still occur at zero crossings of the modulation frequency, this technique's sensitivity to bit transitions of the data has been altered. In FIG. 6C, it is shown that at a 1-1 or 0-0 phase transition, no signal alteration exists that can be used to detect a phase transition. However, a 1-0 or 0-1 transition is detectable since a phase transition in the modulated signal does exist. The opposite results are shown in FIG. 7C for this alternative technique.

To demodulate a PSK encoded signal, the demodulator 114 must detect the modulation frequency, the bit rate, and the bit transitions. Since PSK uses only a single carrier frequency, the modulation frequency is relatively simple to detect. In the system of the present invention, the bit rate is defined between the encoder/modulator 52 and the demodulator. However, bit transitions must still be detected to reliably sample the received audio signal on line 102. To determine the proper sampling point, an identifiable synchronization pattern must exist that provides sufficient detectable bit transitions. In the first PSK modulation technique, this requires sufficient 1-0 and 0-1 transitions in the synchronization pattern. However, with the alternative technique, such a pattern would not generate any bit-timing information. Instead, with this alternative technique, sufficient 1-1 or 0-0 transitions are required to detect the bit timing. Thus, selection of the synchronization pattern is dependent upon the chosen modulation technique.

For the system of the present invention, the following synchronization pattern has been chosen: NNNN11111110101, where N signifies a null or the absence of the modulation frequency, 1 signifies a mark or a first phase of the modulation frequency, and 0 signifies a space or a second, opposite phase of the modulation frequency. Since this pattern contains 1-1 transitions, as required by the N+½-cycle modulation technique, and 1-0, 0-1 transitions, as required by the N-cycle modulation technique, this pattern will function with either of the modulation techniques. For a less generalized synchronization pattern, NNNN1111111 could be used for N+½-cycle modulation and NNNN10101010 could be used for N-cycle modulation.

In certain circumstances, a system can miss the synchronization pattern and attempt to erroneously synchronize on data within a message. If a false sync is achieved, false data will be decoded. Various functions, such as parity detection, can help avoid processing false or corrupted data. Thus, a one-bit parity check is part of the system of the present invention. However, the capability of a one-bit parity check is limited since an error of two or more bits is undetectable. Thus, it is desired that this synchronization pattern not be reproducible within the message's data content to insure that false synchronization will never occur.

Without restrictions upon the data content of the message, a standard character set, such as ASCII, can reproduce the synchronization pattern. For instance, presuming that the most significant bit is sent first, the 7-bit ASCII character string 'Ou' is represented as 10011111110101. The last eleven bits of this pattern are identical to the synchronization pattern. If a synchronization detector did not require detection of the null bits or if the synchronization detector erroneously detected null bits, this ASCII pattern could be falsely detected as the synchronization pattern.

The system of the present invention solves this dilemma as follows. First, synchronization detection requires the detection of at least one of the null bits. Second, a character encoding scheme is chosen that permits sufficient combinations for all required data characters, but excludes the possibility of any binary pattern duplicating the synchronization pattern.

With reference now to Table I, a table is found of character representations for the system of the present invention. This table contains encoding possibilities for 7-, 6-, 5-, 4-, and 3-bit characters. The entries for this table are chosen such that no character combination can reproduce the synchronization pattern. This is accomplished by excluding certain bit patterns, resulting in an encoded character set that can generate no more than 6 consecutive 1's or 0's. Thus, this table is useful in preventing duplication of the NNNN11111110101 synchronization pattern, which can be used both with N-cycle and N+½-cycle modulation. Additionally, this table can be used with the NNNN1111111 synchronization pattern for N+½-cycle modulation.

TABLE I

| 3 BITS | 4 BITS | 5 BITS |
|---|---|---|
| 1-001 | 1-0001 | A-00010 |
| 2-010 | 2-0010 | B-00011 |
| 3-011 | 3-0011 | C-00100 |
| 4-100 | 4-0100 | D-00101 |
| 5-101 | 5-0101 | E-00110 |
| 6-110 | 6-0110 | F-00111 |
|  | 7-0111 | G-01000 |
|  | 8-1000 | H-01001 |
|  | 9-1001 | I-01010 |
|  | 10-1010 | J-01011 |
|  | 11-1011 | K-01100 |
|  | 12-1100 | L-01101 |
|  | 13-1101 | M-01110 |
|  | 14-1110 | N-10001 |
|  |  | O-10010 |
|  |  | P-10011 |
|  |  | Q-10100 |
|  |  | R-10101 |
|  |  | S-10110 |
|  |  | T-10111 |
|  |  | U-11000 |
|  |  | V-11001 |
|  |  | W-11010 |
|  |  | X-11011 |
|  |  | Y-11100 |
|  |  | Z-11101 |

| 6 BITS | | 7 BITS | | |
|---|---|---|---|---|
| 1-000100 | 33-101000 | 1-0001000 | 33-0101100 | 65-1010100 |
| 2-000101 | 34-101001 | 2-0001001 | 34-0101101 | 66-1010101 |
| 3-000110 | 35-101010 | 3-0001010 | 35-0101110 | 67-1010110 |
| 4-000111 | 36-101011 | 4-0001011 | 36-0110001 | 68-1010111 |
| 5-001000 | 37-101100 | 5-0001100 | 37-0110010 | 69-1011000 |
| 6-001001 | 38-101101 | 6-0001101 | 38-0110011 | 70-1011001 |
| 7-001010 | 39-101110 | 7-0001110 | 39-0110100 | 71-1011010 |
| 8-001011 | 40-110001 | 8-0010001 | 40-0110101 | 72-1011011 |
| 9-001100 | 41-110010 | 9-0010010 | 41-0110110 | 73-1011100 |
| 10-001101 | 42-110011 | 10-0010011 | 42-0110111 | 74-1011101 |
| 11-001110 | 43-110100 | 11-0010100 | 43-0111000 | 75-1011110 |
| 12-010001 | 44-110101 | 12-0010101 | 44-0111001 | 76-1100001 |
| 13-010010 | 45-110110 | 13-0010110 | 45-0111010 | 77-1100010 |
| 14-010011 | 46-110111 | 14-0010111 | 46-0111011 | 78-1100011 |
| 15-010100 | 47-111000 | 15-0011000 | 47-0111100 | 79-1100100 |
| 16-010101 | 48-111001 | 16-0011001 | 48-0111101 | 80-1100101 |
| 17-010110 | 49-111010 | 17-0011010 | 49-0111110 | 81-1100110 |
| 18-010111 | 50-111011 | 18-0011011 | 50-1000001 | 82-1100111 |
| 19-011000 |  | 19-0011100 | 51-1000010 | 83-1101000 |
| 20-011001 |  | 20-0011101 | 52-1000011 | 84-1101001 |
| 21-011010 |  | 21-0011110 | 53-1000101 | 85-1101010 |
| 22-011011 |  | 22-0110001 | 54-1000111 | 86-1101011 |
| 23-011100 |  | 23-0110010 | 55-1001000 | 87-1101100 |
| 24-011101 |  | 24-0100011 | 56-1001001 | 88-1101101 |
| 25-011110 |  | 25-0100010 | 57-1001010 | 89-1101110 |
| 26-100001 |  | 26-0100101 | 58-1001011 | 90-1110001 |
| 27-100010 |  | 27-0100110 | 59-1001100 | 91-1110010 |
| 28-100011 |  | 28-0100111 | 60-1001101 | 92-1110011 |
| 29-100100 |  | 29-0101000 | 61-1001110 | 93-1110100 |
| 30-100101 |  | 30-0101001 | 62-1010001 | 94-1110101 |
| 31-100110 |  | 31-0101010 | 63-1010010 | 95-1110110 |
| 32-100111 |  | 32-0101011 | 64-1010011 | 96-1110111 |

Similarly, Table II shows a table containing encoding possibilities for 7-, 6-, 4-, and 3-bit encoded characters where no more than 6 alternating 1's and 0's may occur. Thus, this table is useful in preventing duplication of the previously mentioned NNNN10101010 synchronization pattern for N-cycle modulation.

TABLE II

| 3 BITS | 4 BITS | 6 BITS |
|---|---|---|
| 1--000 | 1--1011 | A--000100 |
| 2--001 | 2--0010 | B--000110 |
| 3--011 | 3--0011 | C--000111 |
| 4--100 | 4--0100 | D--001000 |
| 5--101 | 5--1100 | E--001001 |
| 6--110 | 6--0110 | F--001011 |
|  | 7--0111 | G--001100 |
|  | 8--1101 | H--001101 |

TABLE II-continued

| | | |
|---|---|---|
| 9--1001 | I--001110 | |
| 0--1110 | J--010001 | |
|  | K--010010 | |
|  | L--010011 | |
|  | M--011000 | |
|  | N--011001 | |
|  | O--011011 | |
|  | P--011100 | |
|  | Q--011110 | |
|  | R--100001 | |
|  | S--100010 | |
|  | T--100100 | |
|  | U--100110 | |
|  | V--100111 | |
|  | W--101100 | |
|  | X--101101 | |
|  | Y--101110 | |
|  | Z--110010 | |
|  | ---110011 | |
|  | ---110100 | |
|  | ---110110 | |
|  | ---110111 | |

| 7 BITS | | |
|---|---|---|
| 1--0001000 | 29--0110111 | 57--1101000 |
| 2--0001001 | 30--0111000 | 58--1101001 |
| 3--0001011 | 31--0111001 | 59--1101011 |
| 4--0001100 | 32--0111011 | 60--1101100 |
| 5--0001101 | 33--0111100 | 61--1101101 |
| 6--0001110 | 34--0111110 | 62--1101110 |
| 7--0010001 | 35--1000001 | 63--1110001 |
| 8--0010010 | 36--1000010 | 64--1110010 |
| 9--0010011 | 37--1000011 | 65--1110011 |
| 10--0010100 | 38--1000100 | 66--1110100 |
| 11--0010110 | 39--1000110 | 67--1110110 |
| 12--0010111 | 40--1000111 | 68--1110111 |
| 13--0011000 | 41--1001000 |  |
| 14--0011001 | 42--1001001 |  |
| 15--0011011 | 43--1001011 |  |
| 16--0011100 | 44--1001100 |  |
| 17--0011110 | 45--1001101 |  |
| 18--0100001 | 46--1001110 |  |
| 19--0100010 | 47--1011001 |  |
| 20--0100011 | 48--1011011 |  |
| 21--0100100 | 49--1011100 |  |
| 22--0100110 | 50--1011110 |  |
| 23--0100111 | 51--1100001 |  |
| 24--0110001 | 52--1100010 |  |
| 25--0110010 | 53--1100011 |  |
| 26--0110011 | 54--1100100 |  |
| 27--0110100 | 55--1100110 |  |
| 28--0110110 | 56--1100111 |  |

With reference now to FIG. 8, there is shown a chart of the data message format used for each encoded data frame of the system of the present invention. Each encoded data frame is divided into seven message fields, each performing a prescribed function. The combined size of the seven fields is 63 bits. Thus, at a transmission rate of 8.4 bps, the frame rate is 63/8.4 or 7.5 seconds per frame. With the exception of a 10-second encoded program segment, which is the shortest potential encoded program segment of interest, an encoded program segment is sufficiently long for a plurality of encoded data frames to be transmitted. By transmitting a plurality of encoded data frames within the encoded program segment, the audio integrity of a received encoded program segment can also be checked.

The first message field is a synchronization field 238. As previously discussed, the first modulation technique uses the following 15-bit tertiary synchronization pattern: NNNN11111110101, which is uniquely identifiable by the demodulator and decoder 106. The synchronization field might also be described as being comprised of 4 bits of leading nulls followed by an 11-bit binary synchronization pattern. This synchronization pattern accomplishes two main functions. First, the synchronization pattern is used to adapt the demodulator and decoder 106 and to optimize the bandpass filter 104 to the actual modulation frequency. Second, detected phase transitions within the synchronization pattern are used to adjust sampling of the peak receive output signal supplied on line 128. These functions both optimize the noise immunity and improve the demodulation performance of the system.

As previously discussed, the 1-0 combination used for this synchronization pattern is unique due to the bit encoding used for each character and cannot be reproduced by the data content of any possible encoded data. Additionally, since the leading null bits are not present elsewhere within the data message, the null bits can be used to detect head-cuts, as discussed below.

The next field is a 3-bit message type field 240. Since various types of encoded program segments are possible, this field permits the monitoring station 24 to distinguish between them. Six variations are permitted, as listed in FIG. 8. This field, as well as all other fields, are encoded according to Table I to avoid inadvertent generation of the synchronization pattern.

The next field is a 3-bit duration field 242 that identifies the prescribed duration of the encoded program segment. These durations correspond to the predominantly used commercial lengths. By referencing this field, the monitoring station 24 is notified of the expected encoded program segment duration, and determines a time period during which data is accumulated from the video quality detector 92. Additionally, the successful receipt of each encoded data frame is also noted during this time period. Even if one of the plurality of encoded data frames is not successfully received, the system of the present invention can still generate useful information. These failure modes are discussed below.

The next field is a 36-bit program segment identification field 244, which is four alpha characters followed by four numeric characters. This 8-character sequence is a unique character sequence, which is used to identify a particular original program segment for a commercial. Since the encoding of this data is done using Table I, each alpha character requires 5 bits and each numeric character requires 4 bits and thus, 36 bits in total. Upon receipt of the program segment identification field, the monitoring station 24 references any accumulated data to this field in the local memory 78.

The next field is a sequence code field 146 that contains a 2-bit sequence code. Whenever possible, the encoded data frame repeats within the encoded program segment. Thus, for a 15-second encoded program segment, the 7.5-second encoded data frame will be transmitted twice. Suppose that the first frame was not successfully received. Then, without this sequence field, the monitoring station 24 would only commence accumulating data as of the second encoded data frame, 7.5 seconds into the encoded program segment. This data, by itself, would not be useful without a unique sequence code to designate that this data was from the second encoded data frame. With this additional information, the monitoring station could then determine that an encoded program segment had actually commenced 7.5 seconds before the start of the current encoded data frame and could thus monitor a proper time period. Also, since the video quality detector 92 retains past-history data, this field permits a maximum amount of useful status data to be associated with a received encoded program segment.

The sequence field is limited to 2 bits and thus can only represent four potential modular combinations or sequences. The effect of this limited modular representation is only seen when a message duration of greater than 30 seconds is required. In these cases, after modular sequence number three is transmitted, the next encoded data frame sequence number will again cycle back to modular sequence number zero. Unless four consecutive encoded data frames are lost, this modular sequence number will be sufficient to identify the actual relative sequence of the received encoded data frames. Since a loss of four consecutive encoded data frames is not likely, this limitation is considered insignificant.

The next data field is a 1-bit parity check field 248, which checks the parity of the entire encoded data frame. The usefulness and deficiencies of a single-bit parity check are well known to one of ordinary skill in the art. However, since a multiple-bit error is undetectable, the system of the present invention can optionally take advantage of the plurality of encoded data frames to provide additional data verification since each encoded data frame is only distinguished by its sequence field 246.

The last data field is a terminator pattern 250 consisting of 3 bits of trailing nulls, which are solely used to confirm the end of the encoded data frame and to identify tail-cuts. Tail-cuts are discussed below.

Figure 9A:
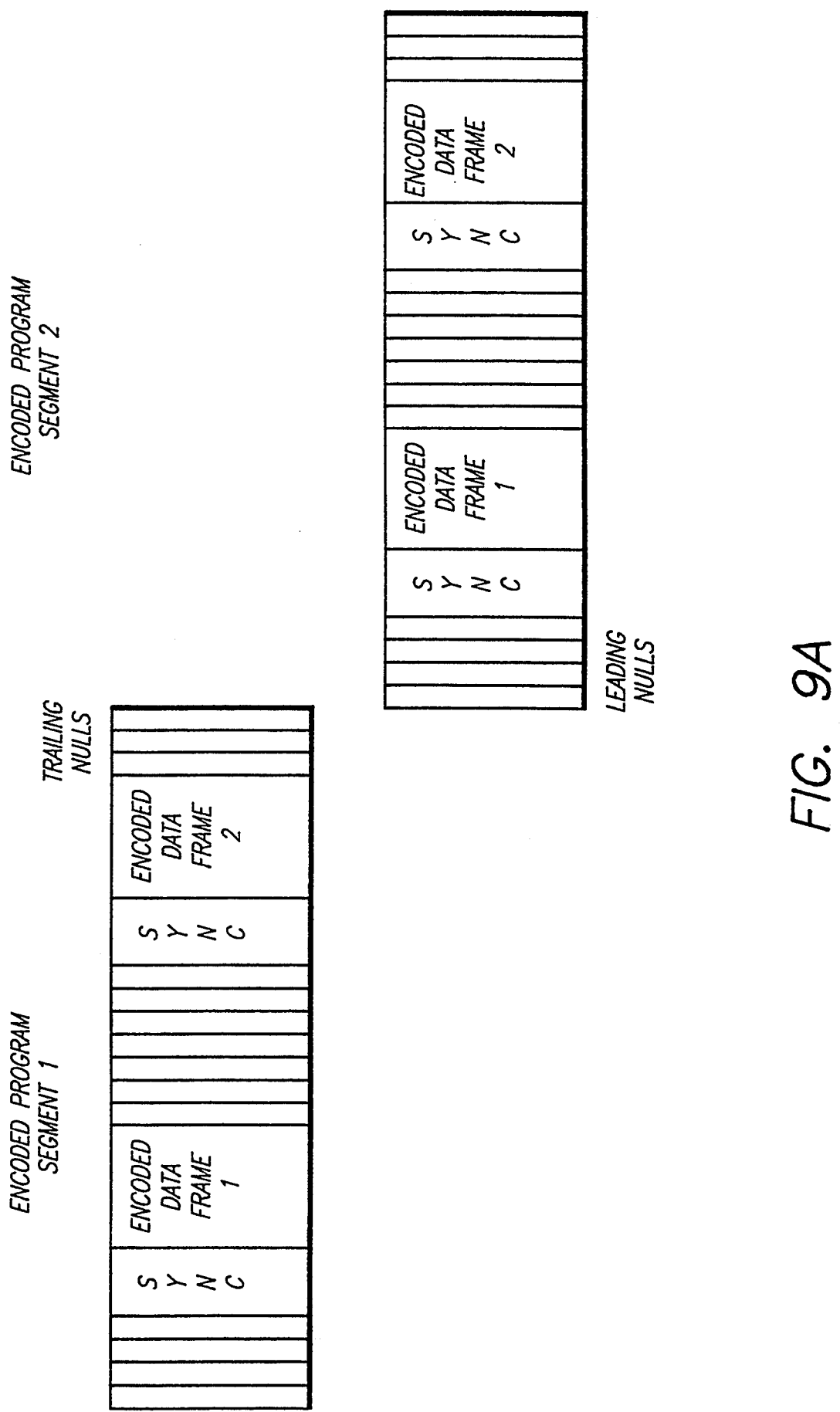
FIG. 9A is a diagram of a normal run-in condition between two consecutive program segments.
Figure 9B:
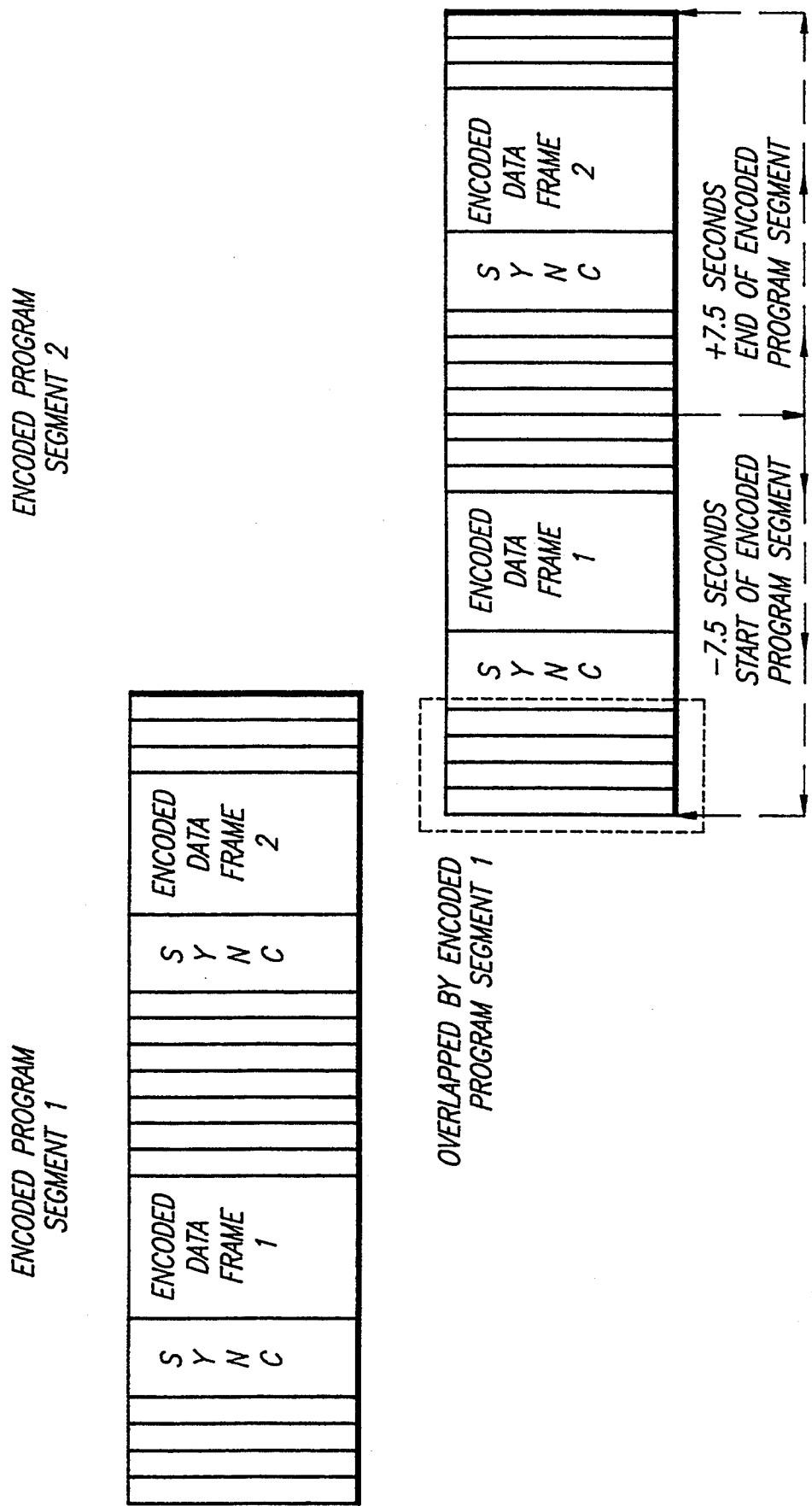
FIG. 9B is a diagram of a head-cut condition between two consecutive program segments.
Figure 9C:
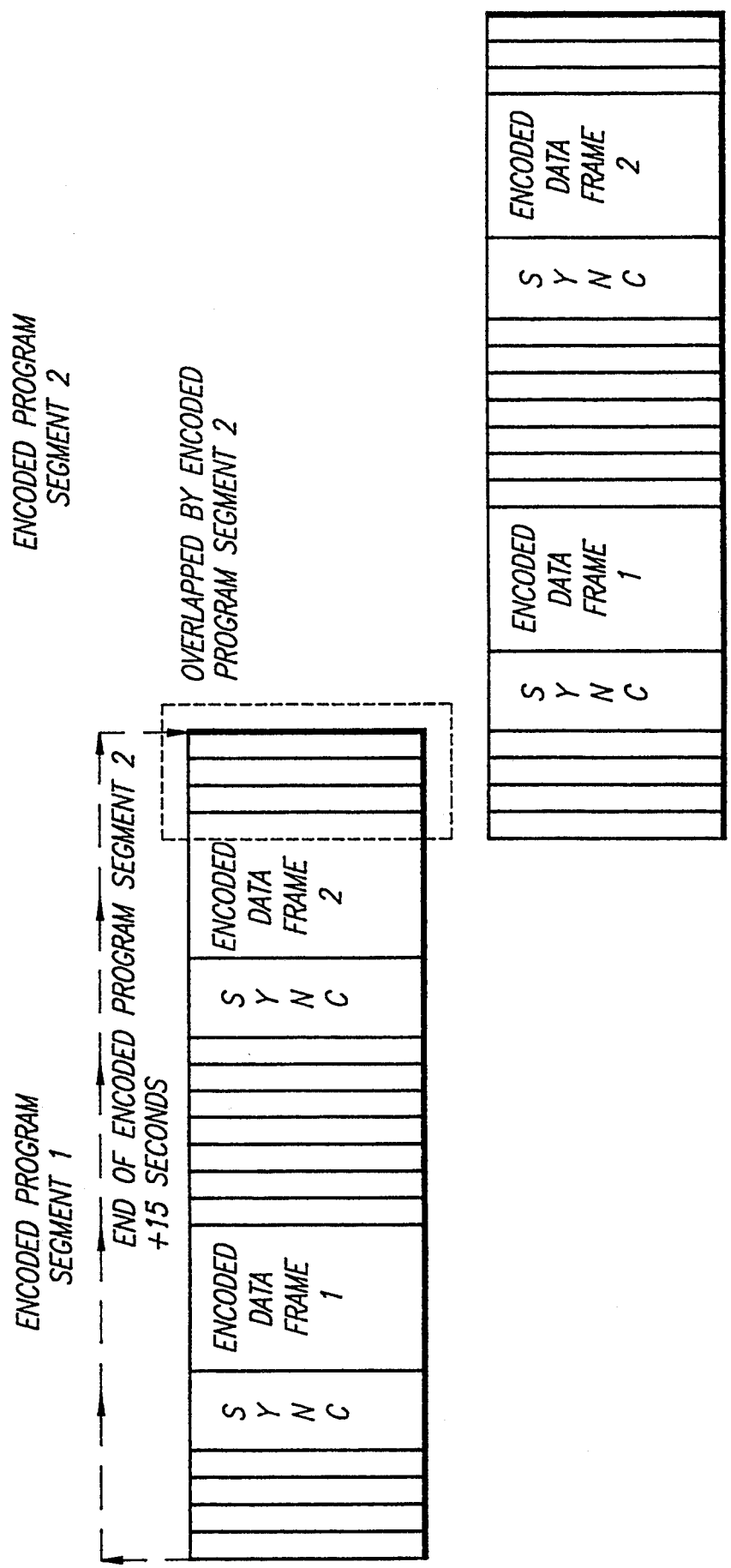
FIG. 9C is a diagram of a tail-cut condition between two consecutive program segments.

With reference now to FIGS. 9A–9C, there are shown examples of interactions between encoded data frames of a plurality of commercial encoded program segments. Ideally, only one commercial encoded program segment would be broadcast in any one time period, eliminating any potential overlap between program segments. However, more than one program segment is normally broadcast each time period and thus it is desirable to detect any overlap that might occur. Normally, a plurality of commercial encoded program segments are broadcast sequentially, resulting in a condition referred to as a run-in. This is a normal condition that occurs when the trailing nulls of a last encoded data frame of a first encoded program segment immediately precede the leading nulls of a first encoded data frame of a next encoded program segment. In this normal run-in condition, shown in FIG. 9A, seven nulls will be consecutively broadcast, i.e., three trailing nulls followed by four leading nulls.

As previously mentioned, this normal run-in condition might not always occur, resulting in head-cut and tail-cut conditions. These conditions occur when the beginning or end of an encoded program segment is lost due to the existence of another encoded program segment that is prematurely or belatedly broadcast. In the case of a head-cut, as shown in FIG. 9B, the leading nulls and the synchronization pattern can be lost due to the overlapping broadcast of the prior encoded program segment. Since more nulls exist than are absolutely required by the synchronization detector 120, a minimal head-cut can be tolerated and just noted by the monitoring station 24. However, a larger head-cut will not permit recognition of the synchronization pattern and thus, encoded data frame 1 of the second encoded program segment will not be detectable. In the example shown, encoded data frame 2 of the second encoded program segment will still be detected and identified. Since encoded data frame 2 still identifies the original program segment identification, its duration, and the sequence number, the monitoring station 24 will still identify the proper monitoring period for the second encoded program segment. However, the monitoring station will additionally note that a head-cut did occur in data stored in the local memory 78. In this particular case, the monitoring station will determine that encoded program segment 2 had commenced 7.5 seconds before the start of the detected encoded data frame, encoded data frame 2, since its sequence number would denote that it was the second encoded data frame.

Tail-cuts are processed in a similar manner. A tail-cut will occur, as shown in FIG. 9C, when a second encoded program segment is broadcast before the end of the first encoded program segment, overlapping a first encoded program segment. Again, a minimal amount of detection tolerance is provided due to the surplus of nulls. However, should any additional trailing amount of the last encoded data frame of the first encoded program segment be lost, the data content of that encoded data frame will be affected and this last encoded data frame will not be decodable. Providing that this was not the only encoded data frame, e.g., when the encoded program segment was 15 seconds or more, the prior encoded data frames will still identify the particular encoded program segment. However, the monitoring station 24 will additionally note that a tail-cut was detected.

A unique condition occurs when an encoded program segment is only 10 seconds long, since a 10-second encoded program segment is not an integral multiple of the 7.5-second duration of an encoded data frame. Since only complete encoded data frames can be broadcast, only a single encoded data frame can be used in this case. The single encoded data frame begins at the start of the 10-second segment, and it is followed by the first 2.5 seconds of a second encoded data frame. Counting the number of bits in the decoded partial second data frame provides a measure of its length, so that the program segment's intended 10-second duration can be verified.

Although the invention has been described in detail with reference only to the presently-preferred embodiments, those of ordinary skill in the art will appreciate that various modifications can be made without departing from the invention. Accordingly, the invention is defined by the following claims.

We claim:

1. An identification system for broadcast program segments, comprising:

means for supplying an original program segment having an audio channel;

means for supplying an encoded data frame of binary digits that includes a synchronization pattern identifying the start of the encoded data frame, a duration field identifying a prescribed program segment duration, and a program segment identification field identifying an original program segment;

means for adding the encoded data frame to the audio channel of the original program segment to form an encoded program segment having an encoded audio channel, wherein the adding means comprises:

audio detection means sensing the start of the original program segment, start detection means using the audio detection means to initiate encoding of at least one encoded data frame and adding of each encoded data frame to the audio channel of the original program segment, time duration input means signifying one of a plurality of prescribed program segment durations, program segment identification input means identifying the original program segment with a plurality of alphanumeric characters, and encoding means generating at least one encoded data frame between the times designated by the start detection means and the time duration input means;

means for receiving and decoding the encoded data frame from within the encoded program segment for identifying the encoded program segment;

means for verifying the integrity of the encoded audio channel of the encoded program segment; and means for storing received data from the encoded data frame.

2. An identification system for broadcast program segments according to claim 1, wherein:

the encoding means comprises a modulator generating a phase-shift modulated signal modulated by the encoded data frame of binary digits; and each binary digit in the modulated signal is represented by an integral number of cycles of a predetermined modulation frequency.

3. An identification system for broadcast program segments according to claim 2, wherein:

the synchronization pattern comprises a first portion constituting an absence of the modulation frequency, and a second portion constituting a first and a second phase of the modulation frequency and corresponding to a first binary pattern;

the program segment identification field comprises the first and the second phase of the modulation frequency corresponding to a second binary pattern; and the system further comprises means for insuring that the second binary pattern is distinct from the first binary pattern.

4. An identification system for broadcast program segments according to claim 1, wherein the adding means additionally comprises video detection means sensing the start of the original program segment wherein the start detection means uses the video detection means to initiate encoding of at least one encoded data frame and adding of each encoded data frame to the audio channel of the original program segment.

5. An identification system for broadcast program segments according to claim 1, wherein:

the encoding means comprises a modulator generating a phase-shift modulated signal modulated by the encoded data frame of binary digits; and each binary digit is represented by an odd integral number of half-cycles of a predetermined modulation frequency.

6. An identification system for broadcast program segments according to claim 5, wherein:

the synchronization pattern comprises a first portion constituting an absence of the modulation frequency, and a second portion constituting a first phase of the modulation frequency and corresponding to a first binary pattern;

the program segment identification field comprises the first and a second phase of the modulation frequency corresponding to a second binary pattern; and the system further comprises means for insuring that the second binary pattern is distinct from the first binary pattern.

7. An identification system for broadcast program segments according to claim 1, wherein the encoding means comprises:
means for temporally placing a first and a last portion of the encoded data frame within the encoded program segment and constituting an absence of a modulation frequency, wherein the absence of either the first or the last encoded data frame portion is identifiable for detecting a truncated encoded data frame;
means for placing a modular sequence code within each encoded data frame signifying a relative sequence of each encoded data frame for uniquely identifying encoded data frames within the encoded program segment whenever the duration of the encoded program segment is greater than or equal to twice the duration of a single encoded data frame, wherein the receipt of each encoded data frame indicates integrity of the encoded audio channel of the encoded program segment; and
means for placing a parity bit within each encoded data frame signifying the parity of each encoded data frame.

8. An identification system for broadcast program segments according to claim 1, wherein the receiving and decoding means comprises:
a tuner programmable to receive the encoded program segment from one of a plurality of broadcast frequencies;
extraction means, coupled to the programmable tuner, for extracting an audio signal with a restricted bandwidth from the encoded program segment; and
a demodulator, coupled to the extraction means, for adjustably decoding encoded data from the audio signal.

9. An identification system for broadcast program segments as defined in claim 1, wherein:
the adding means comprises a modulator generating a phase-shift modulated signal modulated by the encoded data frame of binary digits; and
the receiving and decoding means includes a peak detector for detecting peaks in the phase-shift modulated signal and recognizing differences in the time periods between successive detected peaks indicative of phase shifts representing transitions from one binary digit to the next.

10. An identification system for broadcast program segments as defined in claim 1, wherein:
the adding means comprises a modulator generating a phase-shift modulated signal modulated by the encoded data frame of binary digits; and
the receiving and decoding means includes a correlation detector for cross-correlating the phase-shift modulated signal with a local reference signal and for integrating the result, wherein peaks in the integrated signal indicate phase shifts representing transitions from one binary digit to the next.

11. An identification system for broadcast program segments, comprising:
means for supplying an original program segment having an audio channel;
means for supplying an encoded data frame of binary digits that includes a synchronization pattern identifying the start of the encoded data frame, a duration field identifying a prescribed program segment duration, and a program segment identification field identifying an original program segment;
means for adding the encoded data frame to the audio channel of the original program segment to form an encoded program segment having an encoded audio channel;
means for receiving and decoding the encoded data frame from within the encoded program segment for identifying the encoded program segment, wherein the receiving and decoding means includes means for monitoring energy level per received binary digit, to determine the duration of the encoded data frame;
means for verifying the integrity of the encoded audio channel of the encoded program segment; and
means for storing received data from the encoded data frame.

12. An identification system for broadcast program segments, comprising:
means for supplying an original program segment having an audio channel;
means for supplying an encoded data frame of binary digits that includes a synchronization pattern identifying the start of the encoded data frame, a duration field identifying a prescribed program segment duration, and a program segment identification field identifying an original program segment;
means for adding the encoded data frame to the audio channel of the original program segment to form an encoded program segment having an encoded audio channel;
means for receiving and decoding the encoded data frame from within the encoded program segment for identifying the encoded program segment;
means for verifying the integrity of the encoded audio channel, including means for measuring the rate of the received binary digits and for comparing the measured rate with a predetermined threshold; and
means for storing received data from the encoded data frame.

13. An identification system for broadcast program segments according to claim 1, wherein the means for storing received data comprises:
a computer-accessible memory device;
a computer-interfaceable real-time clock;
a local computer, coupled to the memory device and the real-time clock, storing received data from the encoded data frame in the memory device and timestamping the received data according to the real-time clock;
a computer-interfaceable reference clock; and
a central computer, coupled to the reference clock, periodically communicating with the local computer to synchronize the real-time clock with the reference clock and periodically receiving data stored in the memory device from the local computer.

14. An identification system for broadcast program segments, comprising:
means for supplying an original program segment having an audio channel;
means for supplying an encoded data frame of binary digits that includes a synchronization pattern identifying the start of the encoded data frame, a duration field identifying a prescribed program segment duration, and a program segment identification field identifying an original program segment;

means for adding the encoded data frame to the audio channel of the original program segment to form an encoded program segment having an encoded audio channel;

means for receiving and decoding the encoded data frame from within the encoded program segment for identifying the encoded program segment;

means for verifying the integrity of the encoded audio channel of the encoded program segment;

means for storing received data from the encoded data frame; and means for detecting the quality of a video signal extracted from the encoded program segment, including means for determining the sync level amplitude of the video signal, and means for determining the black/white or composite video levels of the video signal.

15. An identification system for broadcast program segments, comprising:

means for supplying an original program segment having an audio channel;

means for supplying an encoded data frame of binary digits that includes a synchronization pattern identifying the start of the encoded data frame, a duration field identifying a prescribed program segment duration, and a program segment identification field identifying an original program segment; and means for adding the encoded data frame to the audio channel of the original program segment to form an encoded program segment, wherein the adding means comprises audio detection means sensing the start of the original program segment, start detection means using the audio detection means to initiate encoding of at least one encoded data frame and adding of each encoded data frame to the audio channel of the original program segment, time duration input means signifying one of a plurality of prescribed program segment durations, program segment identification input means identifying the original program segment with a plurality of alphanumeric characters, and encoding means generating at least one encoded data frame between the times designated by the start detection means and the time duration input means.

16. An identification system for broadcast program segments according to claim 15, wherein the encoding means comprises a modulator generating a phase-shift modulated signal added to the audio channel of the original program segment wherein each binary digit is represented by an integral number of cycles of a modulation frequency.

17. An identification system for broadcast program segments according to claim 16, wherein:

the synchronization pattern comprises a first portion constituting an absence of the modulation frequency, and a second portion constituting a first and a second phase of the modulation frequency and corresponding to a first binary pattern;

the program segment identification field comprises the first and the second phase of the modulation frequency corresponding to a second binary pattern; and the system further comprises means for insuring that the second binary pattern is distinct from the first binary pattern.

18. An identification system for broadcast program segments according to claim 15, wherein the adding means additionally comprises video detection means sensing the start of the original program segment wherein the start detection means uses the video detection means to initiate encoding of at least one encoded data frame and adding of each encoded data frame to the audio channel of the original program segment.

19. An identification system for broadcast program segments according to claim 15, wherein the encoding means comprises a modulator generating a phase-shift modulated signal added to the audio channel of the original program segment wherein each binary digit is represented by an integral number of half-cycles of a modulation frequency.

20. An identification system for broadcast program segments according to claim 19, wherein:

the synchronization pattern comprises a first portion constituting an absence of the modulation frequency, and a second portion constituting a first phase of the modulation frequency and corresponding to a first binary pattern;

the program segment identification field comprises the first and a second phase of the modulation frequency corresponding to a second binary pattern; and the system further comprises means for insuring that the second binary pattern is distinct from the first binary pattern.

21. An identification system for broadcast program segments according to claim 15, wherein the encoding means comprises:

means for temporally placing a first and a last portion of the encoded data frame within the encoded program segment and constituting an absence of a modulation frequency, wherein the absence of either the first or the last encoded data frame portion is identifiable for detecting a truncated, encoded data frame;

means for placing a modular sequence code within each encoded data frame signifying a relative sequence of each encoded data frame for uniquely identifying encoded data frames within the encoded program segment whenever the duration of the encoded program segment is greater than or equal to twice the duration of a single encoded data frame, wherein the receipt of each encoded data frame indicates integrity of the encoded audio channel of the encoded program segment; and means for placing a parity bit within each encoded data frame signifying the parity of each encoded data frame.

22. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment;

wherein the encoded data frame constitutes a first and a second phase of a modulation frequency and an absence of the modulation frequency;

wherein the synchronization pattern comprises a first portion constituting the absence of the modulation frequency, and a second portion constituting the first and the second phase of the modulation frequency and corresponding to a first binary pattern;

wherein the program segment identification field comprises the first and the second phase of the modulation frequency corresponding to a second binary pattern, distinct from the first binary pattern;

means for receiving and decoding the encoded data frame from within the encoded program segment for identifying the encoded program segment;

means for verifying the integrity of the encoded audio channel of the encoded program segment; and means for storing received data from the encoded data frame.

23. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment, wherein the means for supplying an encoded data frame comprises:

means for temporally placing a first and a last portion of the encoded data frame within the encoded program segment and constituting an absence of a modulation frequency, wherein the absence of either the first or the last encoded data frame portion is identifiable for detecting a truncated, encoded data frame, means for placing a modular sequence code within each encoded data frame signifying a relative sequence of each encoded data frame for uniquely identifying encoded data frames within the encoded program segment whenever the duration of the encoded program segment is greater than or equal to twice the duration of a single encoded data frame, wherein the receipt of each encoded data frame indicates integrity of the encoded audio channel of the encoded program segment, and means for placing a parity bit within each encoded data frame signifying the parity of each encoded data frame;

means for receiving and decoding the encoded data frame from within the encoded program segment for identifying the encoded program segment;

means for verifying the integrity of the encoded audio channel of the encoded program segment; and means for storing received data from the encoded data frame.

24. An identification system for broadcast program segments according to claim 23, wherein the receiving and decoding means comprises:

a tuner programmable to receive the encoded program segment from one of a plurality of broadcast frequencies;

extraction means, coupled to the programmable tuner, for extracting an audio signal with a restricted bandwidth from the encoded program segment; and a demodulator, coupled to the extraction means, for adjustably decoding encoded data from the audio signal.

25. An identification system for broadcast program segments according to claim 23, wherein the means for storing received data comprises:

a computer-accessible memory device;

a computer-interfaceable real-time clock;

a local computer, coupled to the memory device and the real-time clock, storing received data from the encoded data frame in the memory device and timestamping the received data according to the real-time clock;

a computer-interfaceable reference clock; and a central computer, coupled to the reference clock, periodically communicating with the local computer to synchronize the real-time clock with the reference clock and periodically receiving data stored in the memory device from the local computer.

26. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment, wherein the supplying means comprises a modulator generating a phase-shift modulated signal modulated by the encoded data frame of binary digits;

means for receiving and decoding the encoded data frame from within the encoded program segment for identifying the encoded program segment, wherein the receiving and decoding means includes a peak detector for detecting peaks in the phase-shift modulated signal and recognizing differences in the time periods between successive detected peaks indicative of phase shifts representing transitions from one binary digit to the next;

means for verifying the integrity of the encoded audio channel of the encoded program segment; and means for storing received data from the encoded data frame.

27. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment, wherein the supplying means comprises a modulator generating a phase-shift modulated signal modulated by the encoded data frame of binary digits;

means for receiving and decoding the encoded data frame from within the encoded program segment for identifying the encoded program segment Wherein the receiving and decoding means includes a correlation detector for cross-correlating the phase-shift modulated signal with a local reference signal and for integrating the result, wherein peaks in the integrated signal indicate phase shifts representing transitions from one binary digit to the next;

means for verifying the integrity of the encoded audio channel of the encoded program segment; and means for storing received data from the encoded data frame.

28. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment durations and a program segment identification field identifying an original program segment;

means for receiving and decoding the encoded data frame from within the encoded program segment for identifying the encoded program segment, wherein the receiving and decoding means includes means for monitoring energy level per received binary digit, to determine the duration of the encoded data frame;

means for verifying the integrity of the encoded audio channel of the encoded program segment; and means for storing received data from the encoded data frame.

29. An identification system for broadcast program segments, comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment;

means for receiving and decoding the encoded data frame from within the encoded program segment for identifying the encoded program segment;

means for verifying the integrity of the encoded audio channel of the encoded program segment, including means for measuring the rate of the received binary digits and for comparing the measured rate with a predetermined threshold; and means for storing received data from the encoded data frame.

30. An identification system for broadcast program segments, and comprising:

means for supplying an encoded program segment having an audio channel that carries at least one encoded data frame of binary digits that includes a synchronization pattern identifying the start of the encoded data frame, a duration field identifying a prescribed program segment duration, and a program segment identification field identifying an original program segment;

means for receiving and decoding the encoded data frame from within the encoded program segment for identifying the encoded program segment;

means for verifying the integrity of the encoded audio channel of the encoded program segment; and means for storing received data from the encoded data frame; and means for detecting the quality of a video signal extracted from the encoded program segment, including means for determining the sync level amplitude of the video signal, and means for determining the black/white or composite video levels of the video signal.

* * * * *